US012533880B2

(12) United States Patent
Yamasaki et al.

(10) Patent No.: US 12,533,880 B2
(45) Date of Patent: Jan. 27, 2026

(54) HEAD UNIT AND LIQUID DISCHARGE APPARATUS

(71) Applicant: SEIKO EPSON CORPORATION, Tokyo (JP)

(72) Inventors: Sosuke Yamasaki, Shiojiri (JP); Motoki Takabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 120 days.

(21) Appl. No.: 18/441,460

(22) Filed: Feb. 14, 2024

(65) Prior Publication Data

US 2024/0278561 A1 Aug. 22, 2024

(30) Foreign Application Priority Data

Feb. 17, 2023 (JP) ................................ 2023-023517

(51) Int. Cl.
*B41J 2/14* (2006.01)

(52) U.S. Cl.
CPC .. *B41J 2/14233* (2013.01); *B41J 2002/14306* (2013.01); *B41J 2002/14491* (2013.01)

(58) Field of Classification Search
CPC .......... B41J 2/14233; B41J 2002/14306; B41J 2002/14491; B41J 2002/14362
See application file for complete search history.

(56) References Cited

U.S. PATENT DOCUMENTS

2013/0187976 A1* 7/2013 Kobayashi ........... B41J 2/14233 347/19
2022/0305785 A1* 9/2022 Kanegae .............. B41J 2/14088

FOREIGN PATENT DOCUMENTS

JP 2013-151094 A 8/2013

* cited by examiner

*Primary Examiner* — Lisa Solomon
(74) *Attorney, Agent, or Firm* — WORKMAN NYDEGGER

(57) ABSTRACT

A first flexible wiring substrate having one end coupled to a first head side terminal of the first head, drawn out from one side of the first head in the first direction, and provided with a first drive circuit, a second flexible wiring substrate having one end coupled to the second head side terminal of the first head, drawn out from the other side of the first head in the first direction, and provided with a second drive circuit, a first heat radiation member thermally coupled to the second drive circuit, and not thermally coupled to the first drive circuit, and a first heat transfer member thermally coupled to the first drive circuit and the first heat radiation member, and transferring heat generated by the first drive circuit to the first heat radiation member.

12 Claims, 10 Drawing Sheets

HEAD UNIT AND LIQUID DISCHARGE APPARATUS

The present application is based on, and claims priority from JP Application Serial Number 2023-023517, filed Feb. 17, 2023, the disclosure of which is hereby incorporated by reference herein in its entirety.

BACKGROUND

1. Technical Field

The present disclosure relates to a head unit and a liquid discharge apparatus.

2. Related Art

In a liquid discharge apparatus typified by an ink jet printer, a plurality of heads that discharge a liquid such as an ink as a droplet are generally mounted in a unitized state as a head unit.

For example, a head unit disclosed in JP-A-2013-151094 includes a plurality of heads and a holding member to which the plurality of heads are fixed. In JP-A-2013-151094, each head has two nozzle rows, and two chip on film (COF) substrates provided for each nozzle row are drawn out in each head. A drive integrated circuit (IC) is provided in each COF substrate.

In the head unit disclosed in JP-A-2013-151094, the two COF substrates are disposed directly above the head to extend straight in a height direction of the head. Therefore, a member such as a flow path member for supplying a liquid to the head cannot be disposed directly above the head. Here, in order to dispose the member such as the flow path member directly above the head, it is conceivable to draw around the COF substrate in a width direction of the head to avoid a position directly above the head.

In the head unit disclosed in JP-A-2013-151094, the drive IC provided in each COF substrate generates heat when driven. Therefore, the heat generated by this heat generation needs to be radiated to the outside. Therefore, in the related art, a heat radiation member such as a heat radiation fin is provided for each drive IC. However, in this case, the heat radiation member also needs to be disposed between two heads adjacent to each other. Therefore, the heads cannot be disposed close to each other. As a result, it is desirable to increase a size of the head unit.

SUMMARY

According to an aspect of the present disclosure, there is provided a head unit including a first head having a first piezoelectric element, a first head side terminal electrically coupled to the first piezoelectric element, a second piezoelectric element, and a second head side terminal electrically coupled to the second piezoelectric element, a second head having a portion overlapping the first head when viewed in a first direction, having the other portion not overlapping the first head, and located at a position which does not overlap the first head when viewed in a second direction orthogonal to the first direction, a first flexible wiring substrate having one end coupled to the first head side terminal, drawn out from one side of the first head in the first direction, and provided with a first drive circuit, a second flexible wiring substrate having one end coupled to the second head side terminal, drawn out from another side of the first head in the first direction, and provided with a second drive circuit, a first heat radiation member thermally coupled to the second drive circuit, and not thermally coupled to the first drive circuit, and a first heat transfer member thermally coupled to the first drive circuit and the first heat radiation member, and transferring heat generated by the first drive circuit to the first heat radiation member.

According to another aspect of the present disclosure, there is provided a liquid discharge apparatus including the head unit according to the above-described aspect, and a first drive circuit substrate including a first circuit side terminal to which the other end of the first flexible wiring substrate is coupled, and a second circuit side terminal to which the other end of the second flexible wiring substrate is coupled, and transmitting a drive signal for driving the first piezoelectric element and the second piezoelectric element.

DESCRIPTION OF EMBODIMENTS

Figure 1:
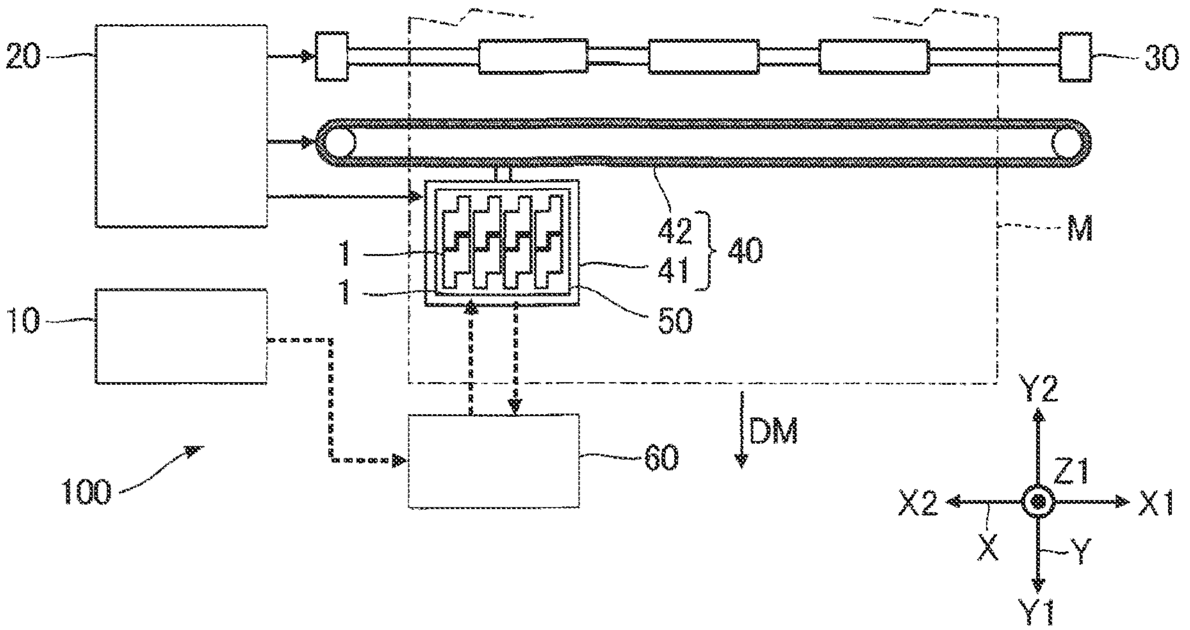
FIG. 1 is a schematic view illustrating a configuration example of a liquid discharge apparatus according to an embodiment.

Hereinafter, preferred embodiments according to the present disclosure will be described with reference to the accompanying drawings. In the drawings, dimensions and scales of each portion are appropriately different from actual ones, and some portions are schematically illustrated to facilitate understanding. In addition, the scope of the present disclosure is not limited to forms thereof unless the present disclosure is particularly limited in the following description.

Hereinafter, for convenience of description, an X-axis, a Y-axis and a Z-axis which intersect each other are appropriately used. A direction along the X-axis is an example of a "first direction", a direction along the Y-axis is an example of a "second direction", and a direction along the Z-axis is an example of a "third direction". In addition, hereinafter, one direction along the X-axis is an X1-direction, and a direction opposite to the X1-direction is an X2-direction. The X1-direction is an example of "one side in the first direction", and the X2-direction is an example of "the other side in the first direction". Similarly, directions opposite to each other along the Y-axis are a Y1-direction and a Y2-direction, and directions opposite to each other along the Z-axis are a Z1-direction and a Z2-direction. The Z1-direction is an example of "one side in the third direction" and is a direction opposite to a normal direction of a discharge surface FN (to be described later).

Here, typically, the Z-axis is a vertical axis, and the Z2-direction corresponds to a downward direction in a vertical direction. However, the present disclosure is not limited to a case where the Z-axis is the vertical axis, and a relationship between the X-axis, the Y-axis, and the Z-axis and the vertical direction is determined in any desired way. In addition, the X-axis, the Y-axis, and the Z-axis are typically orthogonal to each other. However, without being limited thereto, for example, all of these may intersect each other at an angle within a range of 80° or larger and 100° or smaller.

1. Embodiment

1-1. Schematic Configuration of Liquid Discharge Apparatus

FIG. 1 is a schematic view illustrating a configuration example of a liquid discharge apparatus 100 according to an embodiment. The liquid discharge apparatus 100 is an ink jet printing apparatus that discharges an ink which is an example of liquid as a droplet to a medium M. The medium M is typically a printing sheet. The medium M is not limited to the printing sheet, and may be a printing target having any desired material such as a resin film or a cloth.

As illustrated in FIG. 1, the liquid discharge apparatus 100 includes a liquid container 10, a control unit 20, a transport mechanism 30, a moving mechanism 40, a head module 50, and a circulation mechanism 60. Hereinafter, all of these will be briefly described in order with reference to FIG. 1.

The liquid container 10 stores the ink. As a specific aspect of the liquid container 10, for example, a cartridge that can be attached to and detached from the liquid discharge apparatus 100, a bag-shaped ink pack formed of a flexible film, and an ink tank that can be refilled with the ink may be used.

Although not illustrated, the liquid container 10 of the present embodiment has a plurality of containers that store mutually different types of the ink. The ink stored in the plurality of containers is not particularly limited, and any desired type of the ink may be used.

The control unit 20 controls an operation of each element of the liquid discharge apparatus 100. For example, the control unit 20 includes a processing circuit such as a central processing unit (CPU) and a field programmable gate array (FPGA) and a storage circuit such as a semiconductor memory. The control unit 20 outputs a drive signal for driving the head module 50 and a control signal for controlling the driving.

The transport mechanism 30 transports the medium M in a transport direction DM which is the Y1-direction under the control of the control unit 20. The moving mechanism 40 causes the head module 50 to reciprocate in the X1-direction and the X2-direction under the control of the control unit 20. In an example illustrated in FIG. 1, the moving mechanism 40 includes a substantially box-shaped transport body 41 called a carriage for accommodating the head module 50, and a transport belt 42 to which the transport body 41 is fixed. In addition to the head module 50, the above-described liquid container 10 may be mounted on the transport body 41.

Under the control of the control unit 20, the head module 50 discharges the ink supplied from the liquid container 10 via the circulation mechanism 60, from each of the plurality of nozzles to the medium M in the Z2-direction. The ink is simultaneously discharged when the medium M is transported by the transport mechanism 30 and the head module 50 is caused to reciprocate by the moving mechanism 40. In this manner, an image is formed on a surface of the medium M by using the ink. The head module 50 has a plurality of head units 1.

In the example illustrated in FIG. 1, the liquid container 10 is coupled to the head module 50 via the circulation mechanism 60. The circulation mechanism 60 is a mechanism for supplying the ink to the head module 50 and collecting the ink discharged from the head module 50 to resupply the ink to the head module 50. Since the circulation mechanism 60 is operated, an increase in viscosity of the ink can be suppressed, or accumulated air bubbles inside the ink can be reduced. The circulation mechanism 60 may be provided when needed, or may be omitted.

1.2. Head Module

Figure 2:
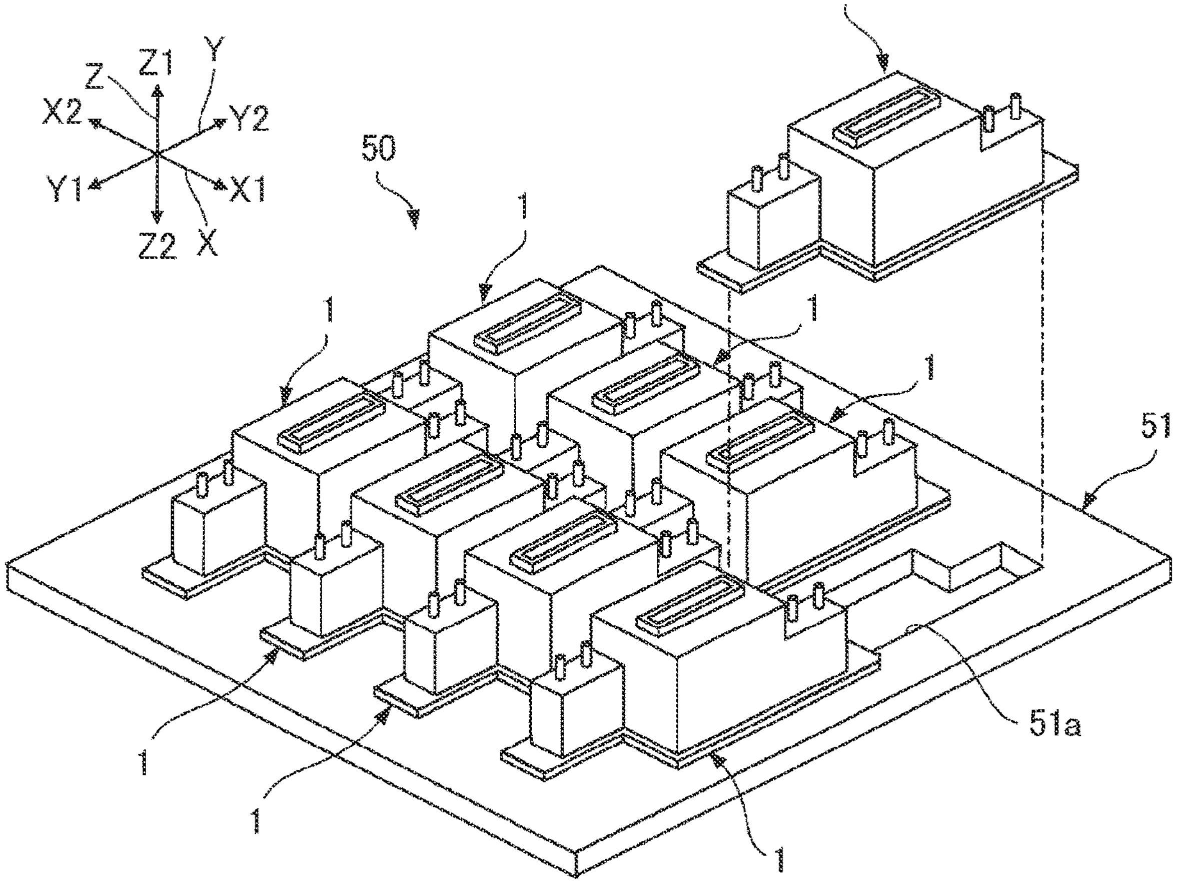
FIG. 2 is a perspective view of a head module.

FIG. 2 is a perspective view of the head module 50. As illustrated in FIG. 2, the head module 50 includes a support body 51 and the plurality of head units 1.

The support body 51 is a plate-shaped member that supports the plurality of head units 1. The support body 51 is provided with a plurality of attachment holes 51*a*. Each head unit 1 is fixed by being screwed to the support body 51 in a state of being inserted into the attachment hole 51*a*. The plurality of head units 1 are disposed in a matrix-shape along the X-axis and the Y-axis.

The number and a disposition of the head units 1 included in the head module 50 are not limited to an example illustrated in FIG. 2, and may be set in any desired way. In addition, a shape of the support body 51 is not limited to the example illustrated in FIG. 2, and may be set in any desired way.

1-3. Head Unit

Figure 3:
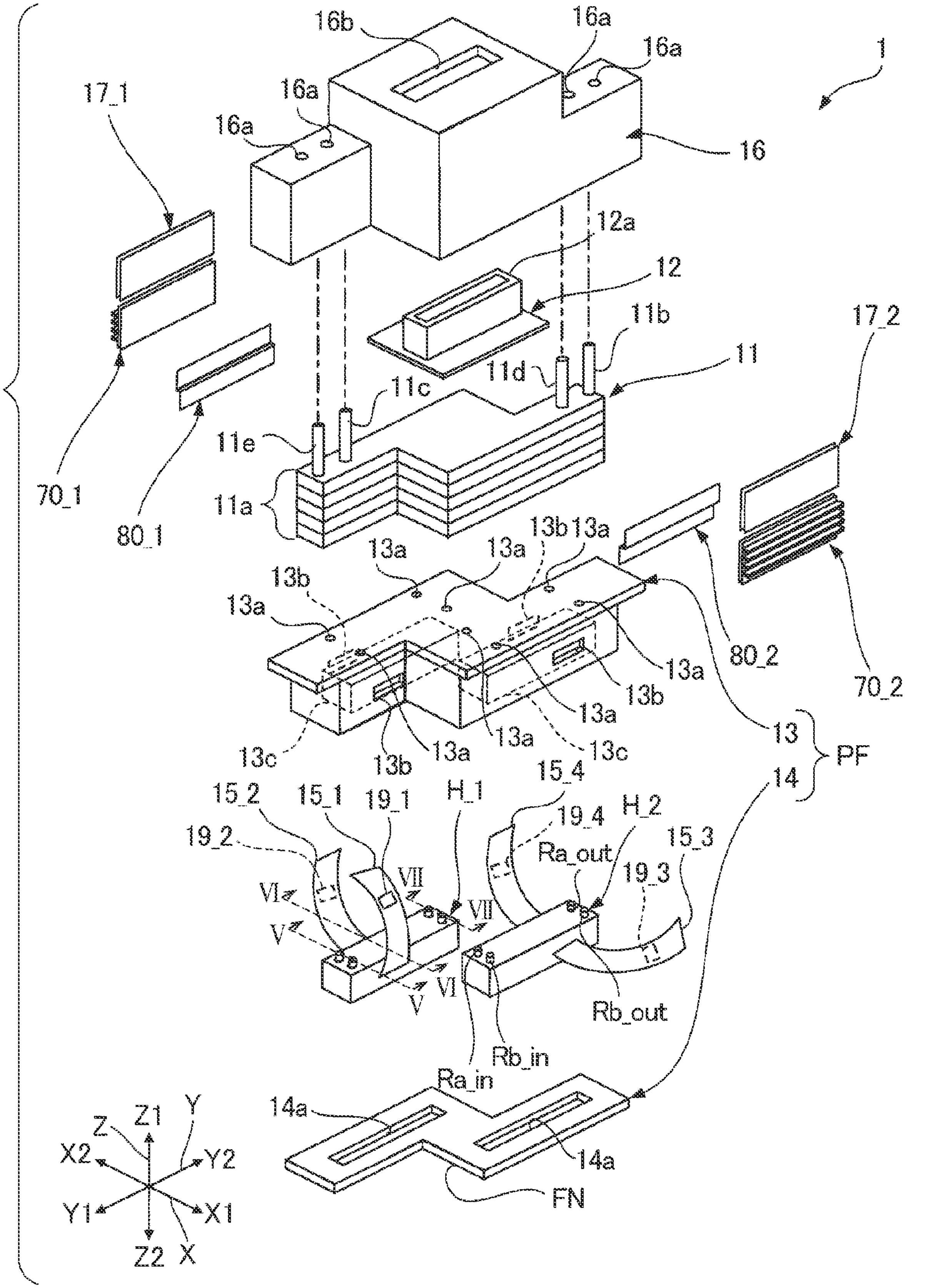
FIG. 3 is an exploded perspective view of a head unit.

FIG. 3 is an exploded perspective view of the head unit 1. As illustrated in FIG. 3, the head unit 1 includes a flow path structure 11, a wiring substrate 12, a holder 13, a first head H_1, a second head H_2, a fixing plate 14, a first flexible wiring substrate 15_1, a second flexible wiring substrate 15_2, a third flexible wiring substrate 15_3, a fourth flexible wiring substrate 15_4, a cover 16, a first drive circuit substrate 17_1, a second drive circuit substrate 17_2, a first heat radiation member 70_1, a second heat radiation member 70_2, a first heat transfer member 80_1, and a second heat transfer member 80_2. Here, the holder 13 and the fixing plate 14 form a fixing portion PF.

Hereinafter, each of the first head H_1 and the second head H_2 may be referred to as a head H in some cases. Each of the first flexible wiring substrate 15_1, the second flexible wiring substrate 15_2, the third flexible wiring substrate 15_3, and the fourth flexible wiring substrate 15_4 may be referred to as a flexible wiring substrate 15 in some cases. Each of the first drive circuit substrate 17_1 and the second drive circuit substrate 17_2 may be referred to as a drive circuit substrate 17 in some cases. Each of the first heat radiation member 70_1 and the second heat radiation member 70_2 may be referred to as a heat radiation member 70 in some cases. Each of the first heat transfer member 80_1 and the second heat transfer member 80_2 may be referred to as a heat transfer member 80 in some cases.

In the head unit 1, the cover 16, the wiring substrate 12, the flow path structure 11, the holder 13, the two heads H, and the fixing plate 14 are aligned in this order in the Z2-direction. In addition, inside the cover 16, the second drive circuit substrate 17_2, the second heat radiation member 70_2, and the second heat transfer member 80_2 are disposed at positions in the X1-direction with respect to the flow path structure 11. On the other hand, the first drive circuit substrate 17_1, the first heat radiation member 70_1, and the first heat transfer member 80_1 are disposed at positions in the X2-direction with respect to the flow path structure 11. Furthermore, the first drive circuit substrate 17_1 is electrically coupled to the first head H_1 via the first flexible wiring substrate 15_1 and the second flexible wiring substrate 15_2. Similarly, the second drive circuit substrate 17_2 is electrically coupled to the second head H_2 via the third flexible wiring substrate 15_3 and the fourth flexible wiring substrate 15_4.

Here, the first flexible wiring substrate 15_1 is provided with a first drive circuit 19_1, and the heat generated in the first drive circuit 19_1 is transferred to the first heat radiation member 70_1 via the first heat transfer member 80_1. Similarly, the fourth flexible wiring substrate 15_4 is provided with a fourth drive circuit 19_4, and the heat generated in the fourth drive circuit 19_4 is transferred to the second heat radiation member 70_2 via the second heat transfer member 80_2. In contrast, the second flexible wiring substrate 15_2 is provided with a second drive circuit 19_2, and the heat generated in the second drive circuit 19_2 is transferred to the first heat radiation member 70_1 without passing through the first heat transfer member 80_1. Similarly, the third flexible wiring substrate 15_3 is provided with a third drive circuit 19_3, and the heat generated in the third drive circuit 19_3 is transferred to the second heat radiation member 70_2 without passing through the second heat transfer member 80_2.

Hereinafter, each part of the head unit 1 will be sequentially described.

The flow path structure 11 is a structure internally provided with a flow path for supplying the ink from the circulation mechanism 60 to the two heads H. The flow path structure 11 includes a flow path member 11*a* and four coupling tubes 11*b* to 11*e*.

Although not illustrated in FIG. 3, the flow path member 11*a* is provided with two supply flow paths for supplying two types of the ink to two heads H for each ink, and two discharge flow paths for discharging the two types of the ink from the two heads H for each ink. Hereinafter, one of the two types of the ink may be referred to as a first ink, and the other may be referred to as a second ink in some cases. The types of the ink used in the liquid discharge apparatus 100 are not limited to two types, and one, three, or more types may be used.

The flow path member 11*a* has a configuration of a stacked body in which a plurality of substrates are stacked in a direction along the Z-axis. For example, each of the plurality of substrates is formed of a resin material such as Zylon, polyphenylene sulfide (PPS), or polypropylene (PP), and is formed by means of injection molding. The "Zylon" is a registered trademark. In addition, for example, the plurality of substrates are joined together by using an adhesive such as an epoxy-based adhesive. The number or a thickness of the substrates forming the flow path member 11*a* is not limited to an example illustrated in FIG. 3, and may be set in any desired way.

Each of the coupling tubes 11*b*, 11*c*, 11*d*, and 11*e* is a tube body protruding from a surface of the flow path member 11*a* which faces the Z1-direction. The coupling tube 11*b* is coupled to one of the two supply flow paths, and the coupling tube 11*c* is coupled to the other of the two supply flow paths. The coupling tube 11*d* is coupled to one of the two discharge flow paths, and the coupling tube 11*e* is coupled to the other of the two discharge flow paths.

The wiring substrate 12 is a mounting component for electrically coupling the head unit 1 to the control unit 20. For example, the wiring substrate 12 is formed of a flexible wiring substrate or a rigid wiring substrate. The wiring substrate 12 is disposed on a surface which faces the Z1-direction of the flow path structure 11. The flow path structure 11 faces a surface of the wiring substrate 12 which faces the Z2-direction. A connector 12*a* is installed on a surface of the wiring substrate 12 which faces the Z1-direction. The connector 12*a* is a coupling component for electrically coupling the head unit 1 and the control unit 20 to each other.

The holder 13 is a structure for holding the two heads H. In addition, the flow path structure 11 is fixed to a surface of the holder 13 which faces the Z1-direction by means of screwing. For example, the holder 13 is formed of a resin material or a metal material. However, as a forming material of the holder 13, it is preferable to use a material having a satisfactory thermal conductivity. Specifically, it is preferable to use a material having a higher thermal conductivity than a material forming the first flexible wiring substrate 15_1 or the second flexible wiring substrate 15_2. More specifically, it is preferable to use a material having a thermal conductivity of 10.0 W/mK or higher at a room temperature (20° C.). For example, it is preferable to use metal materials such as stainless steel, titanium, and magnesium alloys, or ceramic materials such as silicon carbide, aluminum nitride, sapphire, alumina, silicon nitride, cermet, and yttria. Since the holder 13 is formed by using these metal materials or ceramic materials, the heat from the head H can be released to the outside via the holder 13.

The holder 13 is provided with a plurality of holder flow paths 13*a*, a plurality of wiring holes 13*b*, and a plurality of recess portions 13*c*. Each of the plurality of holder flow paths 13*a* is a hole for causing the ink to flow between the head H and the flow path structure 11. The holder flow paths 13*a* are provided to correspond to each of introduction ports Ra_in and Rb_in and discharge ports Ra_out and Rb_out (to be described later). Each of the plurality of wiring holes 13*b* is a hole through which the flexible wiring substrate 15 passes, and two wiring holes 13*b* are provided on each of the surfaces of the holder 13 which faces the X1-direction and which faces the X2-direction. Each of the recess portion 13*c* is open toward the Z2-direction, and is a space for accommodating the head H.

Each head H discharges the ink. Each head H is provided with the introduction ports Ra_in and Rb_in and the discharge ports Ra_out and Rb_out. The introduction port Ra_in is an opening for introducing the first ink, the introduction port Rb_in is an opening for introducing the second ink, the discharge port Ra_out is an opening for discharging the first ink, and the discharge port Rb_out is an opening for discharging the second ink. The introduction ports Ra_in and Rb_in and the discharge ports Ra_out and Rb_out are respectively and mutually joined to the head H and the holder 13 by using an adhesive. In this manner, both ports are liquid-tightly coupled to the corresponding holder flow path 13*a*. A configuration of the head H will be described in detail with reference to FIG. 5 (to be described later).

The first drive circuit substrate 17_1 is electrically coupled to the first head H_1 via the first flexible wiring substrate 15_1 and the second flexible wiring substrate 15_2. Similarly, the second drive circuit substrate 17_2 is electrically coupled to the second head H_2 via the third flexible wiring substrate 15_3 and the fourth flexible wiring substrate 15_4.

For example, each flexible wiring substrate 15 is a flexible wiring substrate such as a chip on film (COF), a flexible printed circuit (FPC), or a flexible flat cable (FFC). However, when the heat transfer member 80 and the drive circuit 19 are thermally coupled in a thickness direction via the flexible wiring substrate 15 as will be described later, each member is relatively thin, and has excellent heat transfer properties in the thickness direction. Therefore, it is preferable that the flexible wiring substrate 15 is the COF or the FPC. The first drive circuit 19_1 is mounted on the first flexible wiring substrate 15_1. The second drive circuit 19_2 is mounted on the second flexible wiring substrate 15_2. The third drive circuit 19_3 is mounted on the third flexible wiring substrate 15_3. The fourth drive circuit 19_4 is mounted on the fourth flexible wiring substrate 15_4. Hereinafter, each of the first drive circuit 19_1, the second drive circuit 19_2, the third drive circuit 19_3, and the fourth drive circuit 19_4 may be referred to as a drive circuit 19 in some cases.

The drive circuit 19 is a circuit that switches whether or not to supply at least a portion of waveforms included in a drive signal as a drive pulse, based on a control signal. Specifically, the first drive circuit 19_1 and the second drive circuit 19_2 are circuits for switching the drive signal to be supplied to the first head H_1. On the other hand, the third drive circuit 19_3 and the fourth drive circuit 19_4 are circuits for switching the drive signal to be supplied to the second head H_2.

This drive circuit 19 generates the heat when driven. When the drive circuit 19 is in an excessively hot state affected by the heat generation, an operation of the drive circuit 19 is likely to be unstable. Therefore, the heat radiation member 70 is provided to radiate the heat generated by the drive circuit 19 to the outside. The heat radiation member 70 is a thermally conductive member for releasing the heat from the drive circuit 19 to the outside. The heat radiation member 70 of the present embodiment is disposed inside the cover 16, and the heat of the heat radiation member 70 is discharged to the outside of the cover 16 via the cover 16. A portion of the heat radiation member 70 may be exposed to the outside of the cover 16.

Here, in order to reduce a size of the head unit 1, the heat radiation member 70 is provided for each head H without being provided for each drive circuit 19. One heat radiation member 70 is shared by the two drive circuits 19 provided in one head H. In addition, in order to suitably transfer the heat from the two drive circuits 19 provided in one head H to one heat radiation member 70, one heat transfer member 80 is provided for each head H. The heat transfer member 80 is a thermally conductive member that transfers the heat from one drive circuit 19 of the two drive circuits 19 provided in one head H to the heat radiation member 70. Details of the heat radiation member 70 and the heat transfer member 80 will be described later with reference to FIGS. 8 to 10.

The drive circuit substrate 17 is a substrate for transmitting the drive signal and the control signal. For example, the drive circuit substrate 17 may be a flexible wiring substrate or a rigid wiring substrate, alternatively, may be a combination of the flexible wiring substrate and the rigid wiring substrate. The drive circuit substrate 17 is electrically coupled to the wiring substrate 12 via a wire (not illustrated). The drive circuit substrate 17 may be formed integrally with the wiring substrate 12.

The fixing plate 14 is a plate-shaped member for fixing two heads H to the holder 13 in common. Here, the fixing plate 14 forms the fixing portion PF together with the holder 13. In this way, the first head H_1 and the second head H_2 are fixed to the fixing portion PF having the holder 13 and the fixing plate 14. Specifically, the fixing plate 14 is disposed in a state where the two heads H are interposed between the fixing plate 14 and the holder 13, and is fixed to the holder 13 by using an adhesive. For example, the fixing plate 14 is formed of a metal material. The fixing plate 14 is provided with a plurality of opening portions 14*a* for exposing nozzles of the two heads H. In an example illustrated in FIG. 3, the plurality of opening portions 14*a* are provided for each of the heads H. A surface of the fixing plate 14 which faces the Z2-direction and a surface of the head H exposed from the opening portion 14*a* form the discharge surface FN. An aspect in which the opening portion 14*a* is shared by the two heads H may be adopted. In addition, another member such as a reinforcing plate may be interposed between the fixing plate 14 and the holder 13.

The cover 16 is a box-shaped member that accommodates the flow path member 11*a* of the flow path structure 11, the wiring substrate 12, and the two drive circuit substrates 17. For example, the cover 16 is formed of a resin material. The cover 16 is provided with four through-holes 16*a* and an opening portion 16*b*. The four through-holes 16*a* correspond to the coupling tubes 11*b*, 11*c*, 11*d*, and 11*e* of the flow path structure 11, and each of the through-hole 16*a* is inserted into any one of the corresponding coupling tubes 11*b*, 11*c*, 11*d*, and 11*e*. The connector 12*a* passes to the outside through the opening portion 16*b* from the inside of the cover 16.

Figure 4:
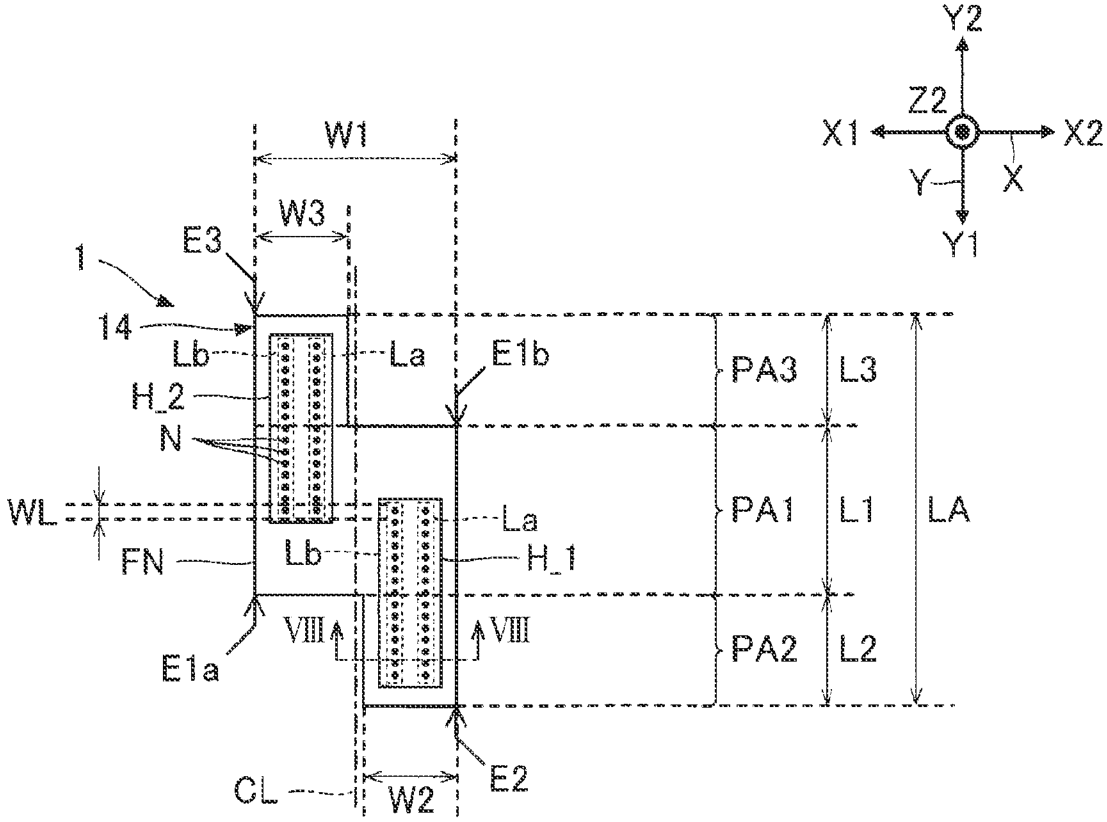
FIG. 4 is a plan view of the head unit.

FIG. 4 is a plan view of the head unit 1. FIG. 4 schematically illustrates a disposition of the heads H in the head unit 1 when viewed in the Z1-direction. That is, FIG. 4 is a plan view schematically illustrating the discharge surface FN of the head unit 1.

As illustrated in FIG. 4, the head unit 1 is divided into a first portion PA1, a second portion PA2, and a third portion PA3 when viewed in a direction along the Z-axis. In other words, the discharge surface FN which is a surface of the head unit 1 when viewed in the Z1-direction has the first portion PA1, the second portion PA2, and the third portion PA3.

The first portion PA1 is located between the second portion PA2 and the third portion PA3. In an example illustrated in FIG. 4, the second portion PA2 is disposed at a position in the Y1-direction with respect to the first portion PA1, and the third portion PA3 is disposed at a position in the Y2-direction with respect to the first portion PA1. In this way, the positions of the first portion PA1, the second portion PA2, and the third portion PA3 in the direction along the Y-axis are different from each other.

The second portion PA2 protrudes in the Y2-direction with respect to an end of the first portion PA1 in the Y2-direction. On the other hand, the third portion PA3 protrudes in the Y1-direction with respect to an end of the first portion PA1 in the Y1-direction. In the example illustrated in FIG. 4, the second portion PA2 is disposed at a position in the X2-direction with respect to a center line CL, and the third portion PA3 is disposed at a position in the X1-direction with respect to the center line CL. In this way, the second portion PA2 and the third portion PA3 are disposed at positions in directions opposite to each other across the center line CL. The center line CL is a virtual line segment parallel to the Y-axis and passing through a center of the first portion PA1.

As illustrated in FIG. 4, a width W2 of the second portion PA2 along the X-axis is shorter than a width W1 of the first portion PA1 along the X-axis. Similarly, a width W3 of the third portion PA3 along the X-axis is shorter than the width W1 of the first portion PA1 along the X-axis. In addition, the width W2 and the width W3 are equal to each other in the example illustrated in FIG. 4. The width W2 and the width W3 may be different from each other. However, when the width W2 and the width W3 are equal to each other, symmetry of the shape of the head unit 1 is improved. Therefore, the head unit 1 can be more freely disposed. Therefore, in this case, there is an advantage in that versatility of the head unit 1 is improved. This advantage also contributes to cost reduction of the liquid discharge apparatus 100.

A length L2 of the second portion PA2 along the Y-axis is shorter than a length L1 of the first portion PA1 along the Y-axis. Similarly, a length L3 of the third portion PA3 along the Y-axis is shorter than the length L1 of the first portion PA1 along the Y-axis. In the example illustrated in FIG. 4, the length L2 and the length L3 are equal to each other. Although the length L2 and the length L3 may be different from each other, when the length L2 and the length L3 are equal to each other, symmetry of the shape of the head unit 1 is improved. Therefore, the head unit 1 can be more freely disposed.

Positions of an end E1*b* of the first portion PA1 in the X2-direction and an end E2 of the second portion PA2 in the X2-direction are the same as each other in the direction along the X-axis. The end E1*b* and the end E2 form a continuous plane as an end surface of the head unit 1 in the X2-direction. Similarly, positions of an end E1*a* of the first portion PA1 in the X1-direction and an end E3 of the third portion PA3 in the X1-direction are the same as each other in the direction along the X-axis. The end E1*a* and the end E3 form a continuous plane as an end surface of the head unit 1 in the X1-direction. A recess portion or a projection portion may be appropriately provided on the end surfaces. In addition, a step may be provided between the end E1*b* and the end E2 or between the end E1*a* and the end E3.

The first head H_1 is provided across the first portion PA1 and the second portion PA2. That is, the first head H_1 has a portion provided in the first portion PA1 and the other portion provided in the second portion PA2, and these portions are continuously coupled. On the other hand, the second head H_2 is provided across the first portion PA1 and the third portion PA3. That is, the second head H_2 has a portion provided in the first portion PA1 and the other portion provided in the third portion PA3, and these portions are continuously coupled.

In addition, the first head H_1 is disposed at a position displaced in the Y1-direction with respect to the second head H_2. The first head H_1 is disposed at a position in the X2-direction with respect to the second head H_2. That is, the first head H_1 and the second head H_2 are disposed at positions in directions opposite to each other across the center line CL.

Here, the first head H_1 and the second head H_2 have portions overlapping each other with a width WL along the Y-axis, when viewed in the direction along the X-axis. Since the width WL is provided in this way, seams of images formed by the first head H_1 and the second head H_2 can be inconspicuous. Although the width WL is not particularly limited, for example, the width WL is approximately a length of three times or more and 10 times or less of a pitch of nozzles N of a nozzle row La or a nozzle row Lb (to be described later).

As can be understood from the above, the first head H_1 and the second head H_2 are disposed to partially overlap each other when viewed in the direction along the X-axis and not to overlap each other when viewed in the direction along the Y-axis. In addition, the first head H_1 and the second head H_2 are disposed not to overlap each other when viewed in the direction along the Z-axis.

1-3. Head

Figure 5:
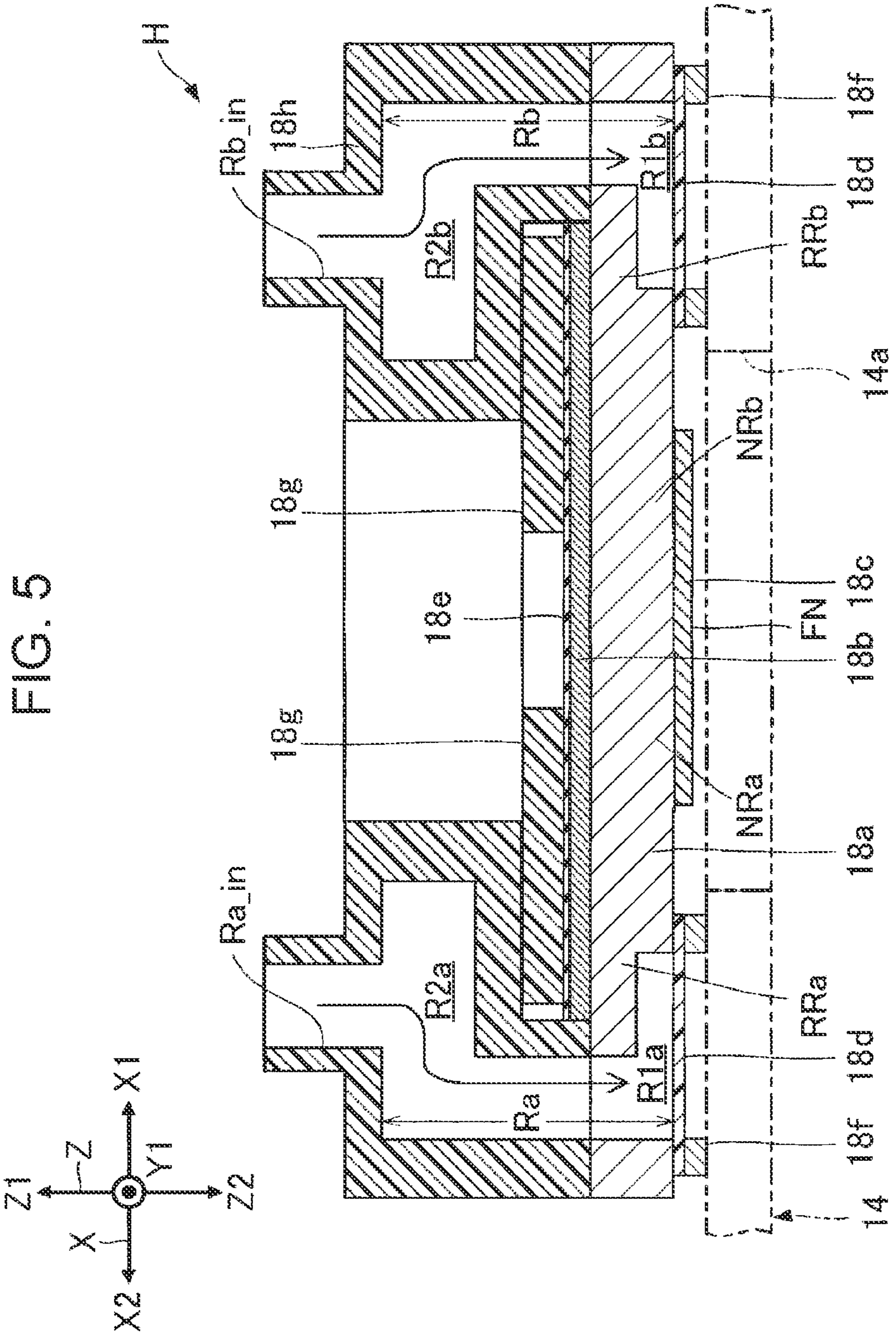
FIG. 5 is a sectional view taken along line V-V in FIG. 3.
Figure 6:
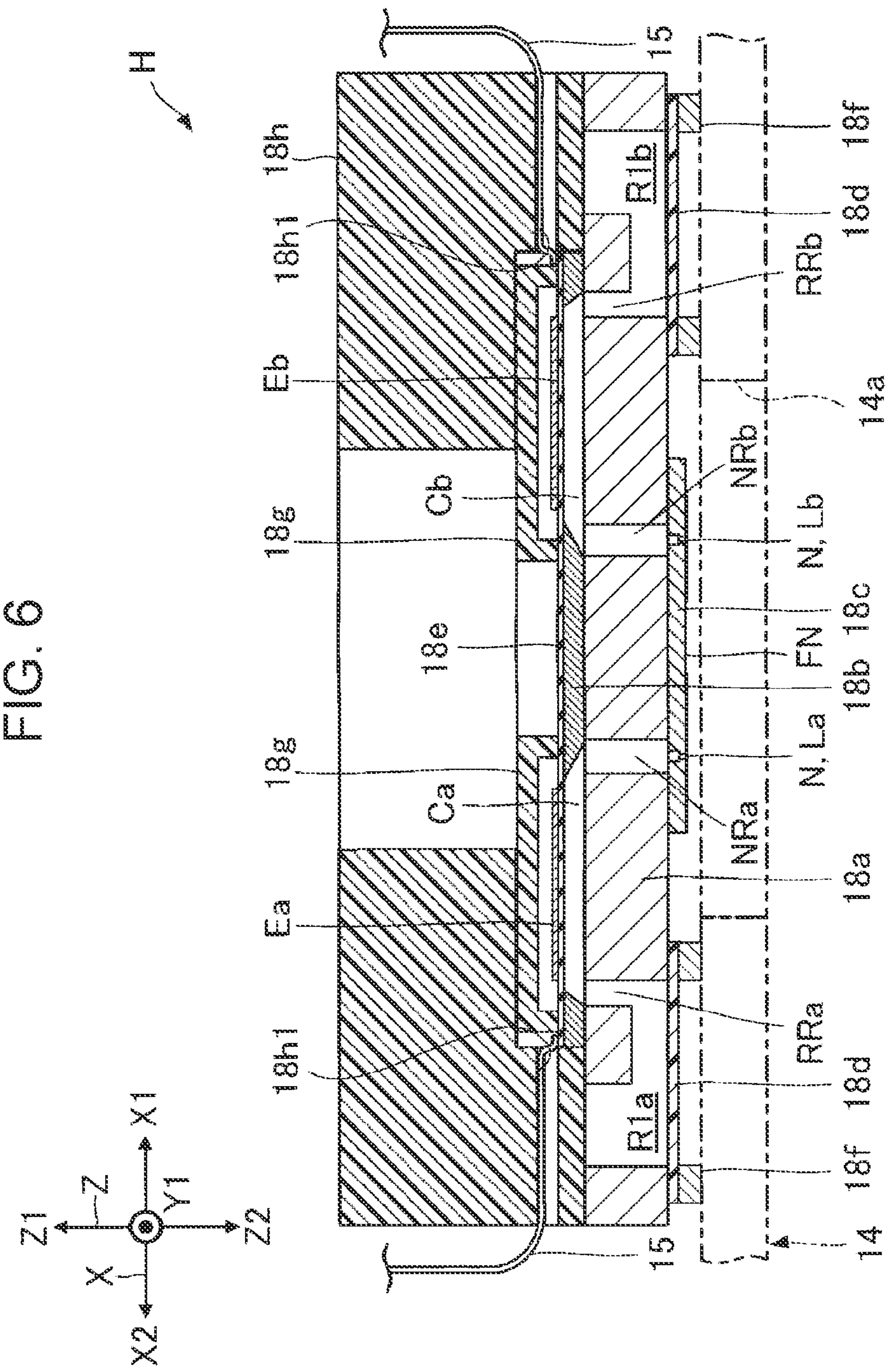
FIG. 6 is a sectional view taken along line VI-VI in FIG. 3.
Figure 7:
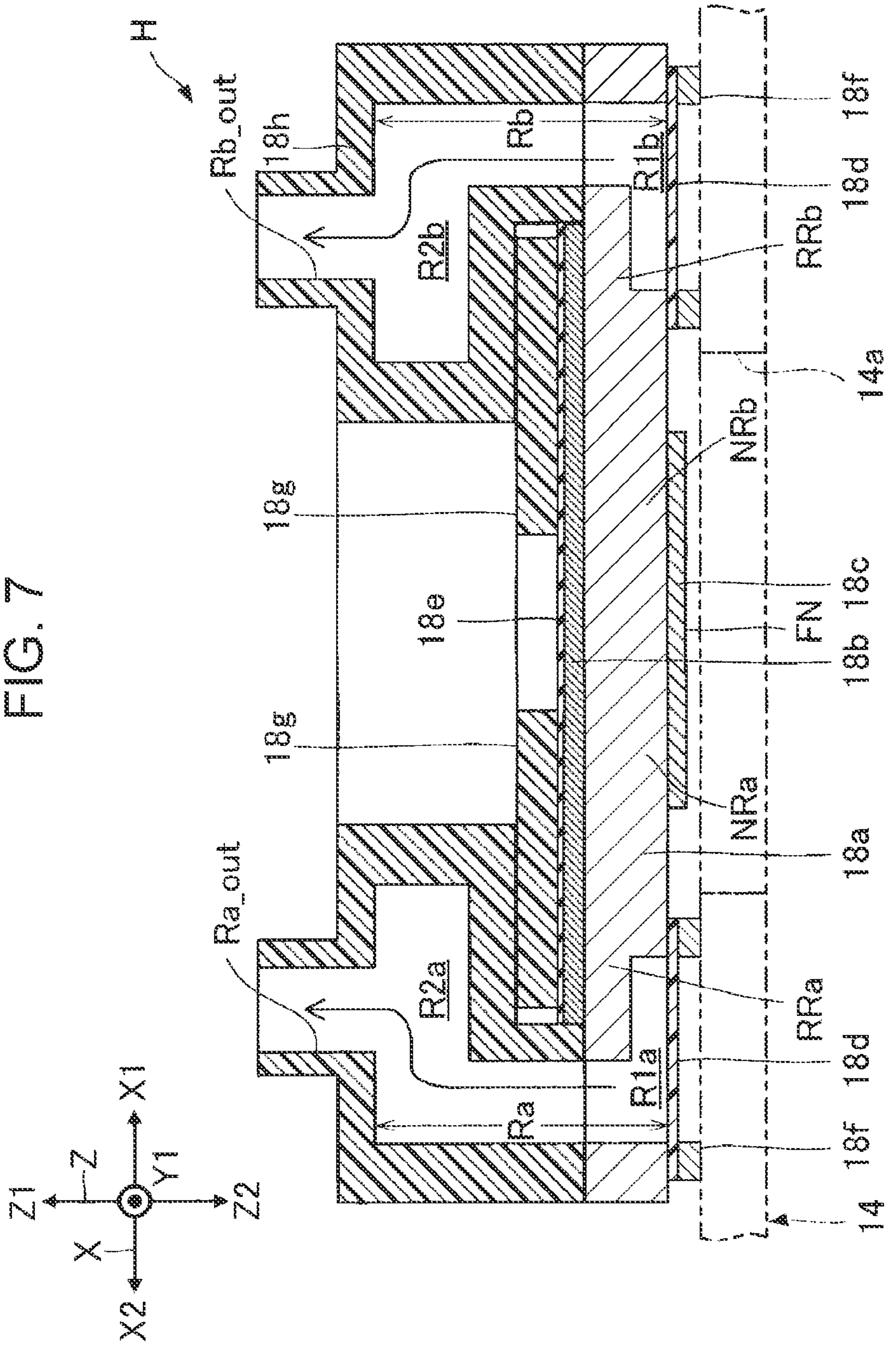
FIG. 7 is a sectional view taken along line VII-VII in FIG. 3.

FIGS. 5 to 7 are sectional views illustrating a configuration example of the head H. FIG. 5 is a sectional view taken along line V-V in FIG. 3, FIG. 6 is a sectional view taken along line VI-VI in FIG. 3, and FIG. 7 is a sectional view taken along line VII-VII in FIG. 3. As illustrated in FIGS. 5 to 7, the head H includes a flow path substrate 18*a*, a pressure chamber substrate 18*b*, a nozzle plate 18*c*, a vibration absorber 18*d*, a vibration plate 18*e*, a plurality of piezoelectric elements Ea and Eb, a cover 18*g*, and a case 18*h*. Here, when the head H is the first head H_1, the piezoelectric element Ea is an example of a "first piezoelectric element", and the piezoelectric element Eb is an example of a "second piezoelectric element". Hereinafter, each of the piezoelectric element Ea and the piezoelectric element Eb may be referred to as a piezoelectric element E in some cases.

The flow path substrate 18*a* and the pressure chamber substrate 18*b* are stacked in this order in the Z1-direction, and form a flow path for supplying the ink to the plurality of nozzles N. The vibration plate 18*e*, the plurality of piezoelectric elements Ea and Eb, the cover 18*g*, the case 18*h*, the flexible wiring substrate 15, and the drive circuit 19 are installed in a region located in the Z1-direction with respect to a stacked body including the flow path substrate 18*a* and the pressure chamber substrate 18*b*. On the other hand, the nozzle plate 18*c* and the vibration absorber 18*d* are installed in a region located in the Z2-direction with respect to the stacked body. Each element of the head H is schematically a plate-shaped member elongated in the Y-direction, and the elements are joined to each other by using an adhesive or by means of direct joining, for example. Hereinafter, each element of the head H will be described in order.

As illustrated in FIG. 6, the nozzle plate 18*c* is a plate-shaped member provided with the plurality of nozzles N. Each of the plurality of nozzles N is a through-hole through which the ink passes. The plurality of nozzles N provided in the nozzle plate 18*c* are divided into the nozzle row La and the nozzle row Lb. Each of the nozzle row La and the nozzle row Lb is a set of the plurality of nozzles N arranged along the Y-axis. The nozzle row La and the nozzle row Lb are disposed at an interval from each other in the X-axis direction.

Here, a surface of the nozzle plate 18*c* which faces the Z2-direction is exposed from the opening portion 14*a* of the fixing plate 14, and forms a portion of the discharge surface FN. For example, the nozzle plate 18*c* is manufactured in such a manner that a silicon single crystal substrate is processed by using a semiconductor manufacturing technique using a processing technique such as dry etching or wet etching. However, other known methods and materials may be appropriately used to manufacture the nozzle plate 18*c*. In addition, a cross-sectional shape of the nozzle is typically a circular shape, but the shape is not limited thereto. For example, the cross-sectional shape of the nozzle may be a non-circular shape such as a polygonal shape or an elliptical shape.

As illustrated in FIGS. 5 to 7, the flow path substrate 18*a* is provided with spaces R1*a* and R1*b*, a plurality of supply flow paths RRa and RRb, and a plurality of communication flow paths NRa and NRb for each of the nozzle rows La and nozzle rows Lb. Each of the spaces R1*a* and R1*b* is an elongated opening extending in the direction along the Y-axis in a plan view in the direction along the Z-axis. Each of the supply flow paths RRa and RRb and the communication flow paths NRa and NRb is a through-hole formed for each nozzle N. Each supply flow path RRa communicates with the space R1*a*. Each supply flow path RRb communicates with the space R1*b*.

As illustrated in FIG. 6, the pressure chamber substrate 18*b* is a plate-shaped member provided with a plurality of pressure chambers Ca and a plurality of pressure chambers Cb. The plurality of pressure chambers Ca are arranged in the direction along the Y-axis. Similarly, the plurality of pressure chambers Cb are arranged in the direction along the Y-axis. Each of the pressure chambers Ca is an elongated space formed for each nozzle N of the nozzle row La and extending in the direction along the X-axis in a plan view. Similarly, each of the pressure chamber Cb is an elongated space formed for each nozzle N of the nozzle row Lb and extending in the direction along the X-axis in a plan view. As in the above-described nozzle plate 18*c*, each of the flow path substrate 18*a* and the pressure chamber substrate 18*b* is manufactured in such a manner that the silicon single crystal substrate is processed by using the semiconductor manufacturing technique, for example. However, other known methods and materials may be appropriately used to manufacture each of the flow path substrate 18*a* and the pressure chamber substrate 18*b*.

The pressure chamber Ca communicates with each of the communication flow path NRa and the supply flow path RRa. Therefore, the pressure chamber Ca communicates with the nozzle N of the nozzle row La via the communication flow path NRa, and communicates with the space R1*a* via the supply flow path RRa. Similarly, the pressure chamber Cb communicates with each of the communication flow path NRb and the supply flow path RRb. Therefore, the pressure chamber Cb communicates with the nozzle N of the nozzle row Lb via the communication flow path NRb, and communicates with the space R1*b* via the supply flow path RRb.

As illustrated in FIGS. 5 to 7, the vibration plate 18*e* is disposed on a surface of the pressure chamber substrate 18*b* which faces the Z1-direction. The vibration plate 18*e* is a plate-shaped member which can elastically vibrate. For example, the vibration plate 18*e* has a first layer and a second layer, and the first layer and the second layer are stacked in this order in the Z1-direction. For example, the first layer is an elastic film formed of silicon oxide ($SiO_2$). For example, the elastic film is formed by thermally oxidizing one surface of a silicon single crystal substrate. For example, the second layer is an insulating film formed of zirconium oxide ($ZrO_2$). For example, the insulating film is formed in such a manner that a zirconium layer is formed by using a sputtering method and the layer is thermally oxidized. The vibration plate 18*e* is not limited to the above-described configuration of stacking the first layer and the second layer. For example, the vibration plate 18*e* may be formed of a single layer, or may be formed of three or more layers.

As illustrated in FIG. 6, the plurality of piezoelectric elements Ea and the plurality of piezoelectric elements Eb are disposed on a surface of the vibration plate 18*e* which faces the Z1-direction. Each of the piezoelectric elements Ea and Eb is a passive element deformed by supplying the drive signal. Each of the piezoelectric elements Ea and Eb has an elongated shape extending in the direction along the X-axis in a plan view. The plurality of piezoelectric elements Ea are arranged to correspond to the plurality of pressure chambers Ca in the direction along the Y-axis. The piezoelectric element Ea overlaps the pressure chamber Ca in a plan view. The plurality of piezoelectric elements Eb are arranged to correspond to the plurality of pressure chambers Cb in the direction along the Y-axis. The piezoelectric element Eb overlaps the pressure chamber Cb in a plan view.

Although not illustrated, each of the piezoelectric elements Ea and Eb includes a first electrode, a piezoelectric layer, and a second electrode, and these are stacked in this order in the Z1-direction. One electrode of the first electrode and the second electrode is an individual electrode disposed away from each other for each piezoelectric element Ea or for each piezoelectric element Eb, and a drive signal is applied to the one electrode. The other electrode of the first electrode and the second electrode is a band-shaped common electrode extending in the direction along the Y-axis to be continuous over the plurality of piezoelectric elements Ea or over the plurality of piezoelectric elements Eb, and a predetermined reference potential is supplied to the other electrode. For example, a metal material of the electrodes includes a metal material such as platinum (Pt), aluminum (Al), nickel (Ni), gold (Au), and copper (Cu). Out of the materials, one type can be used alone, or two or more types can be used in combination in an alloyed or stacked aspect. The piezoelectric layer is formed of a piezoelectric material such as lead zirconate titanate (Pb (Zr, Ti) $O_3$). For example, the piezoelectric layer forms a band shape extending in the direction along the Y-axis to be continuous over the plurality of piezoelectric elements Ea or over the plurality of piezoelectric elements Eb. However, the piezoelectric layer may be individually provided for each piezoelectric element Ea or for each piezoelectric element Eb. When the vibration plate 18*e* vibrates in conjunction with deformation of the above-described piezoelectric element Ea, a pressure inside the pressure chamber Ca fluctuates, and the ink is discharged from the nozzle N of the nozzle row La. Similarly, when the vibration plate 18*e* vibrates in conjunction with deformation of the piezoelectric element Eb, the pressure inside the pressure chamber Cb fluctuates, and the ink is discharged from the nozzle N of the nozzle row Lb.

As illustrated in FIG. 6, the cover 18*g* is a plate-shaped member installed on a surface of the vibration plate 18*e* which faces the Z1-direction, protects the plurality of piezoelectric elements Ea and the plurality of piezoelectric elements Eb, and reinforces mechanical strength of the vibration plate 18*e*. Here, the plurality of piezoelectric elements Ea and the plurality of piezoelectric elements Eb are accommodated between the cover 18*g* and the vibration plate 18*e*. For example, the cover 18*g* is formed of a resin material.

As illustrated in FIGS. 5 to 7, the case 18*h* is a case for storing the ink to be supplied to the plurality of pressure chambers Ca and the plurality of pressure chambers Cb. For example, the case 18*h* is formed of a resin material. The case 18*h* is provided with spaces R2*a* and R2*b*, introduction ports Ra_in and Rb_in, and discharge ports Ra_out and Rb_out. The space R2*a* is a space communicating with the above-described space R1*a*, and functions as a liquid storage chamber Ra which is a reservoir for storing the ink to be supplied to the plurality of pressure chambers C together with the space R1*a*. As indicated by an arrow in FIG. 5, the first ink is introduced into the liquid storage chamber Ra via the introduction port Ra_in. The first ink inside the liquid storage chamber Ra flows in the Y2-direction, and is supplied to each pressure chamber Ca via each supply flow path RRa coupled to the liquid storage chamber Ra (FIG. 6). In the first ink flowing through the liquid storage chamber Ra, the first ink that is not supplied to each pressure chamber Ca is discharged via the discharge port Ra_out by an operation of the circulation mechanism 60, as illustrated by an arrow in FIG. 7. Similarly, the space R2*b* is a space communicating with the above-described space R1*b*, and functions as a liquid storage chamber Rb which is a reservoir for storing the ink to be supplied to the plurality of pressure chambers Cb together with the space R1*b*. As indicated by an arrow in FIG. 5, the second ink is introduced into the liquid storage chamber Rb via the introduction port Rb_in. The second ink inside the liquid storage chamber Rb flows in the Y2-direction, and is supplied to each pressure chamber Cb via each supply flow path RRb coupled to the liquid storage chamber Rb (FIG. 6). In the second ink flowing through the liquid storage chamber Rb, the second ink that is not supplied to each pressure chamber Cb is discharged via the discharge port Rb_out by an operation of the circulation mechanism 60, as indicated by an arrow in FIG. 7.

In the present embodiment, as illustrated in FIGS. 5 and 7, the spaces R2*a* and R2*b* are respectively provided in both end portions of the case 18*h* in the direction along the Y-axis. However, as illustrated in FIG. 6, the spaces R2*a* and R2*b* are not provided in a central portion in the direction along the Y-axis of the case 18*h*. The reason is as follows. In the central portion of the case 18*h*, each ink may flow inside each of the liquid storage chambers Ra and Rb in the Y2-direction as described above, and may reach each of the pressure chambers Ca and Cb, and the ink does not need to flow toward the case 18*h* side (Z1 side) with respect to the flow path substrate 18*a*. Instead, in the central portion of the case 18*h*, two wiring holes 18*h*1 penetrating in the direction along the X-axis are provided by utilizing a fact that the spaces R2*a* and R2*b* are not provided. Each of the two wiring holes 18*h*1 is a hole for drawing out the flexible wiring substrate 15 from an end of the head H in the direction along the X-axis. Out of the two wiring holes 18*h*1, one wiring hole 18*h*1 penetrates from the inside to the outside in the X2-direction, and the other wiring hole 18*h*1 penetrates from the inside to the outside in the X1-direction.

The vibration absorber 18*d* is also called a compliance substrate, is a flexible resin film forming wall surfaces of the liquid storage chambers Ra and Rb, and absorbs pressure fluctuations of the ink inside the liquid storage chambers Ra and Rb. The vibration absorber 18*d* may be a flexible thin plate formed of metal. A surface of the vibration absorber 18*d* which faces the Z1-direction is joined to the flow path substrate 18*a* by using an adhesive. On the other hand, a frame body 18*f* is joined to a surface of the vibration absorber 18*d* which faces the Z2-direction by using an adhesive. The frame body 18*f* is a frame-shaped member along an outer periphery of the vibration absorber 18*d*, and comes into contact with the above-described fixing plate 14. Here, for example, the frame body 18*f* is formed of a metal material such as stainless steel, aluminum, titanium, and a magnesium alloy. Here, a surface of the fixing plate 14 which faces the Z2-direction forms the discharge surface FN together with a portion exposed from the opening portion 14*a* on a surface of each nozzle plate 18*c* which faces the Z2-direction.

The two flexible wiring substrates 15 are coupled to the head H having the above-described configuration. Here, one end of each of the two flexible wiring substrates 15 extends in the direction along the Y-axis, and is joined to a wire (not illustrated) provided on a surface of the vibration plate 18*e* of the head H which faces the Z1-direction. The wire is electrically coupled to the piezoelectric elements Ea and Eb.

Out of the two flexible wiring substrates 15 coupled to the head H, one flexible wiring substrate 15 is electrically coupled to the piezoelectric element Eb, and is drawn out from an end of the head H in the X1-direction through one wiring hole 18*h*1 of the two wiring holes 18*h*1 described above. Out of the two flexible wiring substrates 15, the other flexible wiring substrate 15 is electrically coupled to the piezoelectric element Ea, and is drawn out from an end of the head H in the X2-direction through the other wiring hole 18*h*1 of the two wiring holes 18*h*1 described above.

When the head H is the first head H_1, the one flexible wiring substrate 15 is the first flexible wiring substrate 15_1, and the other flexible wiring substrate 15 is the second flexible wiring substrate 15_2. In addition, when the head H is the second head H_2, the one flexible wiring substrate 15 is the third flexible wiring substrate 15_3, and the other flexible wiring substrate 15 is the fourth flexible wiring substrate 15_4.

The head H may be configured so that the flexible wiring substrate 15 is drawn out from both ends or the vicinity of the head H in the direction along the X-axis, and may be configured in any desired way without being limited to the examples illustrated in FIGS. 5 to 7. For example, in the examples illustrated in FIGS. 5 to 7, the flexible wiring substrate 15 is drawn out from each of both end surfaces of the head H in the direction along the X-axis. However, the present disclosure is not limited thereto. For example, the flexible wiring substrate 15 may be drawn out from each surface of both end portions of the head H which faces the Z1-direction in the direction along the X-axis.

1-4. Drawing Around Flexible Wiring Substrate

Figure 8:
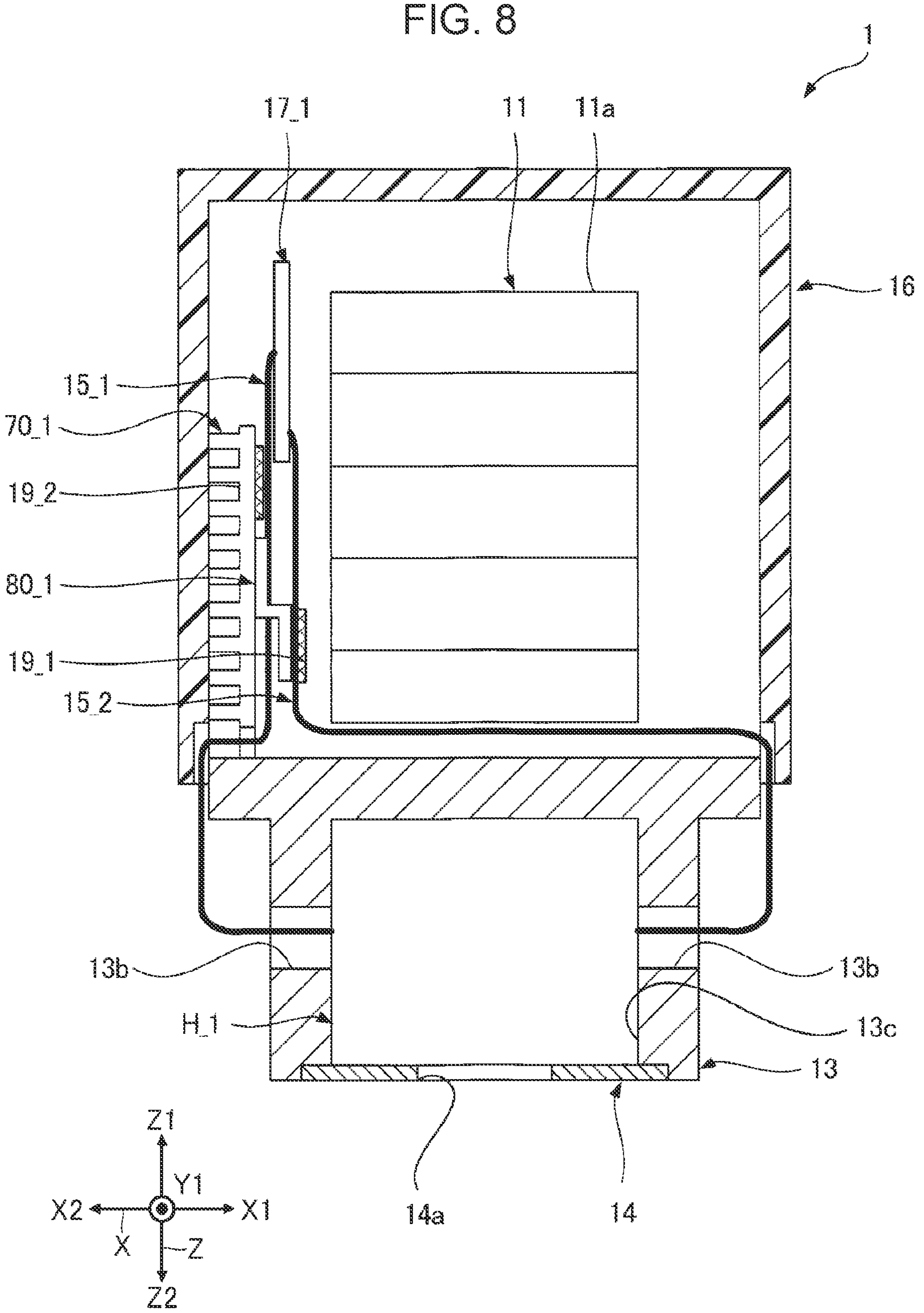
FIG. 8 is a sectional view taken along line VIII-VIII in FIG. 4.

FIG. 8 is a sectional view taken along line VIII-VIII in FIG. 4. As illustrated in FIG. 8, the flow path member 11*a* is disposed at a position in the Z1-direction with respect to the first head H_1. Here, the flow path member 11*a* is disposed inside the cover 16, and the first drive circuit substrate 17_1 is disposed in the direction along the X-axis in a posture where the direction along the X-axis is set as the thickness direction between the surface of the flow path member 11*a* which faces the X2-direction and the cover 16.

The first flexible wiring substrate 15_1 passes between the flow path member 11*a* and the first head H_1 from the first head H_1, and is coupled to the first drive circuit substrate 17_1. In contrast, the second flexible wiring substrate 15_2 is coupled to the first drive circuit substrate 17_1 without passing between the flow path member 11*a* and the first head H_1 from the first head H_1.

Similarly, although not illustrated, the third flexible wiring substrate 15_3 is coupled to the second drive circuit substrate 17_2 without passing between the flow path member 11*a* and the second head H_2 from the second head H_2. In contrast, the fourth flexible wiring substrate 15_4 passes between the flow path member 11*a* and the second head H_2 from the second head H_2, and is coupled to the second drive circuit substrate 17_2. Although not illustrated, the second drive circuit substrate 17_2 is disposed in a posture where the direction along the X-axis is set as the thickness direction between a surface of the flow path member 11*a* which faces the X1-direction and the cover 16.

As described above, since each of the flexible wiring substrates 15 is drawn around, the first drive circuit substrate 17_1 and the first head H_1 can be electrically coupled to each other via the first flexible wiring substrate 15_1 and the second flexible wiring substrate 15_2 in a state where other members such as the flow path member 11*a* are disposed directly above the first head H_1 and the second head H_2, and the second drive circuit substrate 17_2 and the second head H_2 can be electrically coupled to each other via the third flexible wiring substrate 15_3 and the fourth flexible wiring substrate 15_4.

Here, as described above, a portion of the second head H_2 is adjacent to a portion of the first head H_1 at a position in the X1-direction, and the flow path member 11*a* is disposed across a position directly above the first head H_1 and a position directly above the second head H_2. Therefore, the first drive circuit substrate 17_1 needs to be disposed at a position in the X2-direction with respect to at least the center of the first head H_1. Accordingly, it is more preferable that the first drive circuit substrate 17_1 is disposed at a position in the X2-direction with respect to an end portion of the first head H_1 in the X2-direction. Similarly, the second drive circuit substrate 17_2 needs to be disposed at a position in the X1-direction with respect to at least the center of the second head H_2. Accordingly, it is more preferable that the second drive circuit substrate 17_2 is disposed at a position in the X1-direction with respect to an end portion of the second head H_2 in the X1-direction.

The second flexible wiring substrate 15_2 is disposed at a position in the X2-direction with respect to the first flexible wiring substrate 15_1, at a position in the X2-direction with respect to the flow path member 11*a*. The first heat radiation member 70_1 is disposed between the second flexible wiring substrate 15_2 and the cover 16 at a position in the X2-direction with respect to the flow path member 11*a*, and the first heat transfer member 80_1 is disposed between the first flexible wiring substrate 15_1 and the first heat radiation member 70_1.

Here, each of the first drive circuit 19_1 and the second drive circuit 19_2 is disposed at a position in the X2-direction with respect to the flow path member 11*a*. The first heat radiation member 70_1 is thermally coupled to each of the second drive circuit 19_2 and the cover 16 without being thermally coupled to the first drive circuit 19_1. Therefore, the heat generated in the second drive circuit 19_2 is efficiently transferred to the first heat radiation member 70_1. In addition, the heat of the first heat radiation member 70_1 is efficiently radiated to the outside via the cover 16. In addition, the first heat transfer member 80_1 is thermally coupled to each of the first drive circuit 19_1 and the first heat radiation member 70_1. Therefore, the heat generated in the first drive circuit 19_1 is efficiently transferred to the first heat radiation member 70_1 via the first heat transfer member 80_1.

In the present specification, "thermal coupling" means a state where two members are physically in contact with each other, and additionally a state where a gap of 100 μm or smaller or an interposed object having a thickness of 1 mm or smaller (preferably, 0.7 mm or smaller) is interposed between the two members. For example, the interposed object is an FPC substrate, a heat transfer grease, or an adhesive. Hereinafter, the interposed object may be referred to as a heat coupling interposed object in some cases.

In the present embodiment, although the first flexible wiring substrate 15_1 is interposed between the first heat transfer member 80_1 and the first drive circuit 19_1, the thickness of the first flexible wiring substrate 15_1 is extremely thin as 100 μm or smaller. Therefore, the heat can be relatively efficiently transferred from the first drive circuit 19_1 to the first heat transfer member 80_1 via the first flexible wiring substrate 15_1. That is, the first flexible wiring substrate 15_1 corresponds to the above-described heat coupling interposed object, and the first drive circuit 19_1 and the first heat transfer member 80_1 are thermally coupled via the first flexible wiring substrate 15_1. In addition, the first heat transfer member 80_1 and the first heat radiation member 70_1 are thermally coupled to each other without passing through any of the first flexible wiring substrate 15_1 and the second flexible wiring substrate 15_2, and the heat can be relatively efficiently transferred from the first heat transfer member 80_1 to the first heat radiation member 70_1. In the present embodiment, the first heat radiation member 70_1 is thermally coupled to the holder 13 in addition to the first heat transfer member 80_1, the second drive circuit 19_2, and the cover 16. Therefore, the heat of the first heat radiation member 70_1 can be released to the holder 13, and the heat can be radiated to the outside from the holder 13.

Although not illustrated in FIG. 8, the third flexible wiring substrate 15_3 is disposed at a position in the X1-direction with respect to the fourth flexible wiring substrate 15_4, at a position in the X1-direction with respect to the flow path member 11*a*. The second heat radiation member 70_2 is disposed between the third flexible wiring substrate 15_3 and the cover 16 at a position in the X1-direction with respect to the flow path member 11*a*, and the second heat transfer member 80_2 is disposed between the third flexible wiring substrate 15_3 and the fourth flexible wiring substrate 15_4.

Here, each of the third drive circuit 19_3 and the fourth drive circuit 19_4 is disposed at a position in the X1-direction with respect to the flow path member 11*a*. The second heat radiation member 70_2 is thermally coupled to each of the third drive circuit 19_3 and the cover 16 without being thermally coupled to the fourth drive circuit 19_4. Therefore, the heat generated in the third drive circuit 19_3 is efficiently transferred to the second heat radiation member 70_2. In addition, the heat of the second heat radiation member 70_2 is efficiently radiated to the outside via the cover 16. In addition, the second heat transfer member 80_2 is thermally coupled to each of the fourth drive circuit 19_4 and the second heat radiation member 70_2. Therefore, the heat generated in the fourth drive circuit 19_4 is efficiently transferred to the second heat radiation member 70_2 via the second heat transfer member 80_2.

In the present embodiment, the fourth flexible wiring substrate 15_4 is interposed between the second heat transfer member 80_2 and the fourth drive circuit 19_4. However, the thickness of the fourth flexible wiring substrate 15_4 is extremely thin. Therefore, the heat can be relatively efficiently transferred from the fourth drive circuit 19_4 to the second heat transfer member 80_2 via the fourth flexible wiring substrate 15_4. That is, the fourth flexible wiring substrate 15_4 corresponds to the above-described heat coupling interposed object, and the fourth drive circuit 19_4 and the second heat transfer member 80_2 are thermally coupled via the fourth flexible wiring substrate 15_4. In addition, the second heat transfer member 80_2 and the second heat radiation member 70_2 are thermally coupled to each other without passing through any of the third flexible wiring substrate 15_3 and the fourth flexible wiring substrate 15_4, and the heat can be relatively efficiently transferred from the second heat transfer member 80_2 to the second heat radiation member 70_2. In the present embodiment, the second heat radiation member 70_2 is thermally coupled to the holder 13 in addition to the second heat transfer member 80_2, the third drive circuit 19_3, and the cover 16. Therefore, the heat of the second heat radiation member 70_2 can be released to the holder 13, and heat can be radiated to the outside from the holder 13.

A configuration relating to the heat radiation as described above will be described in detail with reference to FIGS. 9 and 10.

Figure 9:
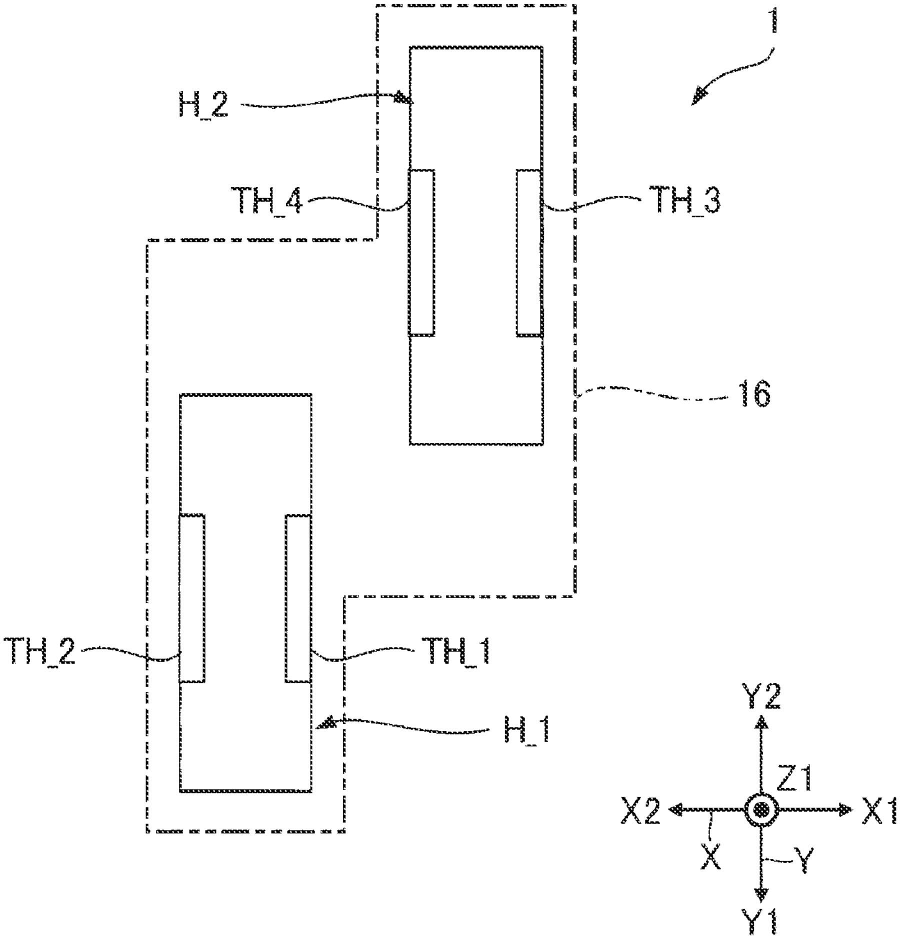
FIG. 9 is a plan view schematically illustrating a disposition of terminals of each head.

FIG. 9 is a plan view schematically illustrating a disposition of terminals of each head H. FIG. 9 schematically illustrates the disposition of the terminals of each head H in the head unit 1 when viewed in the Z2-direction. FIG. 10 is a schematic view for describing the head H, the drive circuit substrate 17, the flexible wiring substrate 15, the heat radiation member 70, and the heat transfer member 80. For convenience of description, FIG. 10 schematically illustrates the disposition of the head H, the drive circuit substrate 17, the flexible wiring substrate 15, the heat radiation member 70, and the heat transfer member 80 when viewed in the Y2-direction. In FIG. 10, the first head H_1 and the second head H_2 are adjacent to each other in the direction along the X-axis. However, as described above, as illustrated in FIG. 9, the first head H_1 and the second head H_2 are disposed to be displaced in the direction along the Y-axis. In addition, in FIGS. 9 and 10, for convenience of description, each portion is schematically illustrated, and dimensions of each portion are appropriately different from actual dimensions.

Figure 10:
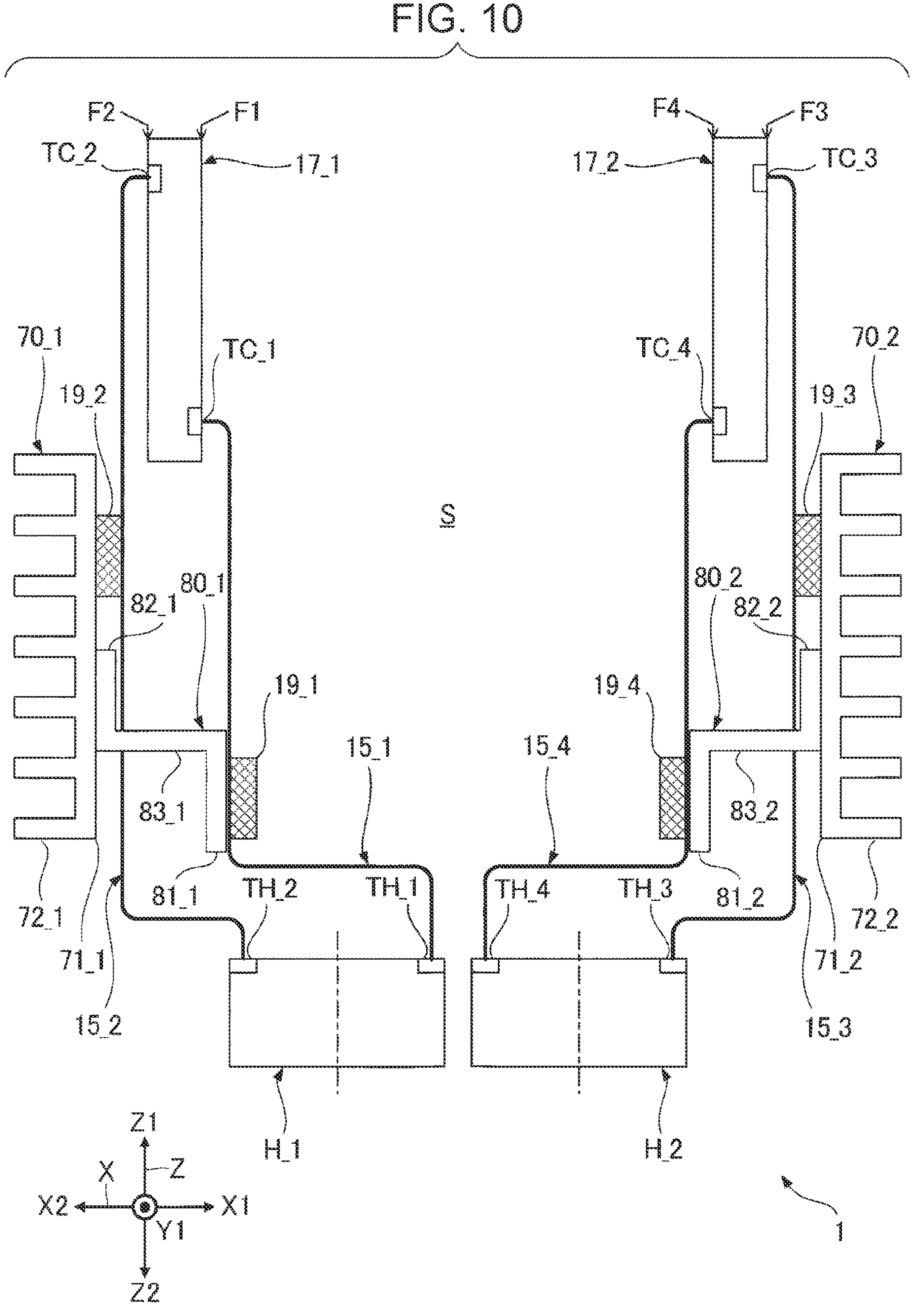
FIG. 10 is a schematic view for describing a head, a drive circuit substrate, a flexible wiring substrate, a heat radiation member, and a heat transfer member.

As illustrated in FIGS. 9 and 10, the first head H_1 is provided with a first head side terminal TH_1 and a second head side terminal TH_2.

The first head side terminal TH_1 is a terminal provided for each nozzle N of the nozzle row Lb of the first head H_1 and electrically coupled to the piezoelectric element Eb of the first head H_1. A wire (not illustrated) in one end of the first flexible wiring substrate 15_1 is coupled to the first head side terminal TH_1 by a conductive joining material such as a conductive adhesive. The first flexible wiring substrate 15_1 is drawn from an end of the first head H_1 in the X1-direction. In addition, in FIGS. 9 and 10, for convenience of description, the first head side terminal TH_1 is located in the end of the first head H_1 in the X1-direction. However, as long as an aspect is adopted so that the first flexible wiring substrate 15_1 is drawn out from the end or the vicinity of the first head H_1 in the X1-direction, the first head side terminal TH_1 may be located at any desired position.

Here, as described above, the second head H_2 is disposed at a position in the X1-direction with respect to the first head H_1. However, as illustrated in FIG. 9, the first head H_1 is disposed to be displaced in the Y1-direction with respect to the second head H_2. Therefore, the first flexible wiring substrate 15_1 can be drawn out from the end of the first head H_1 in the X1-direction.

The second head side terminal TH_2 is a terminal provided for each nozzle N of the nozzle row La of the first head H_1 and electrically coupled to the piezoelectric element Ea of the first head H_1. A wire (not illustrated) in one end of the second flexible wiring substrate 15_2 is coupled to the second head side terminal TH_2 by a conductive joining material such as a conductive adhesive. The second flexible wiring substrate 15_2 is drawn out from the end of the first head H_1 in the X2-direction. In FIGS. 9 and 10, the second head side terminal TH_2 is located in the end of the first head H_1 in the X2-direction. However, as long as an aspect is adopted so that the second flexible wiring substrate 15_2 is drawn out from the end or the vicinity of the first head H_1 in the X2-direction, the second head side terminal TH_2 may be located at any desired position.

Here, as described above, the second head H_2 is not disposed at the position in the X2-direction with respect to the first head H_1. Therefore, the second flexible wiring substrate 15_2 can be drawn out from the end of the first head H_1 in the X2-direction without being hindered by the second head H_2.

As illustrated in FIG. 10, the first drive circuit 19_1 is disposed on a surface of the first flexible wiring substrate 15_1 which faces the outside, that is, a surface facing a direction away from the second flexible wiring substrate 15_2 out of both surfaces of the first flexible wiring substrate 15_1. The first drive circuit 19_1 is joined to a wire (not illustrated) of the first flexible wiring substrate 15_1 by a conductive joining material such as a conductive adhesive. On the other hand, the second drive circuit 19_2 is disposed on a surface of the second flexible wiring substrate 15_2 which faces the outside, that is, a surface facing a direction away from the first flexible wiring substrate 15_1 out of both surfaces of the second flexible wiring substrate 15_2. The second drive circuit 19_2 is joined to a wire (not illustrated) of the second flexible wiring substrate 15_2 by a conductive joining material such as a conductive adhesive.

On the other hand, the first drive circuit substrate 17_1 is disposed at a position displaced in the X2-direction with respect to the center of the first head H_1, at a position in the Z1-direction with respect to the first head H_1. Here, the first drive circuit substrate 17_1 has a first surface F1 and a second surface F2 as plate surfaces. The first surface F1 is disposed to face the X1-direction, and the second surface F2 is disposed to face the X2-direction. In an example illustrated in FIG. 10, the first drive circuit substrate 17_1 is disposed at a position which does not overlap the first head H_1 when viewed in the direction along the Z-axis. That is, the first drive circuit substrate 17_1 is disposed at a position in the X2-direction with respect to the entire first head H_1.

The first drive circuit substrate 17_1 may be disposed at a position displaced in the X2-direction with respect to the center of the first head H_1, and may overlap the first head H_1 when viewed in the direction along the Z-axis. However, from a viewpoint of sufficiently securing a space S as an installation space for the flow path member 11*a*, it is preferable that the first drive circuit substrate 17_1 is disposed at a position which does not overlap the first head H_1 when viewed in the direction along the Z-axis.

The first drive circuit substrate 17_1 is provided with a first circuit side terminal TC_1 and a second circuit side terminal TC_2.

The first circuit side terminal TC_1 is a terminal provided in one end of a wire (not illustrated) that transmits a drive signal for the piezoelectric element Eb in the first drive circuit substrate 17_1. The first circuit side terminal TC_1 is provided on the first surface F1, and a wire (not illustrated) in the other end of the first flexible wiring substrate 15_1 is coupled to the first circuit side terminal TC_1 by a conductive joining material such as a conductive adhesive.

The second circuit side terminal TC_2 is a terminal provided in one end of a wire (not illustrated) that transmits a drive signal for the piezoelectric element Ea in the first drive circuit substrate 17_1. The second circuit side terminal TC_2 is provided on the second surface F2, and a wire (not illustrated) in the other end of the second flexible wiring substrate 15_2 is coupled to the second circuit side terminal TC_2 by a conductive joining material such as a conductive adhesive.

In this way, the first circuit side terminal TC_1 and the second circuit side terminal TC_2 are provided on surfaces of the first drive circuit substrate 17_1 which face directions opposite to each other. In this manner, without displacing positions of the terminals in the direction along the Y-axis, the positions of the first circuit side terminal TC_1 and the second circuit side terminal TC_2 can be displaced from each other in the direction along the Z-axis.

In the first drive circuit substrate 17_1, the first circuit side terminal TC_1 is disposed at a position in the Z2-direction with respect to the second circuit side terminal TC_2. In an example illustrated in FIG. 9, whereas the first circuit side terminal TC_1 is disposed at a position in the Z2-direction with respect to the center of the first drive circuit substrate 17_1 in the direction along the Z-axis, the second circuit side terminal TC_2 is disposed at a position in the Z1-direction with respect to the center of the first drive circuit substrate 17_1 in the direction along the Z-axis.

In this manner, the first circuit side terminal TC_1 is disposed at a position in the Z1-direction with respect to the second circuit side terminal TC_2. In this manner, even when the lengths of the first flexible wiring substrate 15_1 and the second flexible wiring substrate 15_2 which are drawn around at a position in the X2-direction with respect to the flow path member 11*a* are equal to each other, a bending difference between these substrates can be reduced. As a result, a disconnection risk of these substrates can be reduced.

In addition to the second drive circuit 19_2, the first heat radiation member 70_1 is disposed on a surface of the second flexible wiring substrate 15_2 which faces the outside, that is, a surface facing a direction away from the first flexible wiring substrate 15_1 out of both surfaces of the second flexible wiring substrate 15_2.

The first heat radiation member 70_1 is disposed on the second flexible wiring substrate 15_2 in a state of being thermally coupled to the surface of the second drive circuit 19_2 which faces the X2-direction. The first heat radiation member 70_1 may be joined to the second drive circuit 19_2 by using an adhesive as long as the first heat radiation member 70_1 can be thermally coupled to the second drive circuit 19_2, may be in contact with the second drive circuit 19_2 without being joined thereto, or may face the second drive circuit 19_2 with a minute space therebetween. However, from a viewpoint of improving a thermal conductivity between the first heat radiation member 70_1 and the second drive circuit 19_2, it is preferable that the minute space is filled with a filler containing a thermal conductive filler or a heat transfer grease.

In the example illustrated in FIG. 10, the first heat radiation member 70_1 includes a base portion 71_1 and a plurality of fins 72_1. The base portion 71_1 has a plate shape in which the direction along the X-axis is set as a plate thickness direction. The second drive circuit 19_2 and the first heat transfer member 80_1 are thermally coupled to a surface of the base portion 71_1 which faces the X1-direction. On the other hand, the plurality of fins 72_1 are provided on a surface of the base portion 71_1 which faces the X2-direction. Each of the plurality of fins 72_1 protrudes in the X2-direction, and extends in the direction along the Y-axis. In this manner, a surface area of the first heat radiation member 70_1 can be increased, and as a result, heat radiation of the first heat radiation member 70_1 can be improved.

A configuration of the first heat radiation member 70_1 is not limited to the example illustrated in FIG. 10, and may be adopted in any desired way. An aspect such as a shape and a size of the base portion 71_1 is not limited to the example illustrated in FIG. 10, and may be adopted in any desired way. For example, an aspect such as a shape, the number, a disposition of the fins 72_1 is not limited to the example illustrated in FIG. 10, and may be adopted in any desired way, or may be omitted.

The first heat radiation member 70_1 described above is thermally coupled to the first heat transfer member 80_1. The first heat transfer member 80_1 is disposed to avoid the second flexible wiring substrate 15_2, and is thermally coupled to the first heat radiation member 70_1. In addition, the first heat transfer member 80_1 is thermally coupled to the first drive circuit 19_1 in addition to the first heat radiation member 70_1 via the first flexible wiring substrate 15_1. Here, the first heat transfer member 80_1 may be joined to the first flexible wiring substrate 15_1 by using an adhesive as long as the first heat transfer member 80_1 can be thermally coupled to the first flexible wiring substrate 15_1, may be in contact with the first flexible wiring substrate 15_1 without being joined thereto, or may face the first flexible wiring substrate 15_1 with a minute space therebetween. However, from a viewpoint of improving a thermal conductivity between the first heat transfer member 80_1 and the first drive circuit 19_1, it is preferable that the minute space is filled with a filler containing a thermal conductive filler or a heat transfer grease.

In the example illustrated in FIG. 10, the first heat transfer member 80_1 includes a portion 81_1, a portion 82_1, and a portion 83_1. Each of the portion 81_1 and the portion 82_1 has a plate shape in which the direction along the X-axis is set as the plate thickness direction. A surface of the portion 81_1 which faces the X1-direction is thermally coupled to the first drive circuit 19_1 via the first flexible wiring substrate 15_1. In this manner, the heat generated in the first drive circuit 19_1 can be received by the portion 81_1. On the other hand, a surface of the portion 82_1 which faces the X2-direction is thermally coupled to the first heat radiation member 70_1 without passing through the second flexible wiring substrate 15_2. In this manner, the heat of the portion 82_1 can be efficiently transferred to the first heat radiation member 70_1. Here, the portion 82_1 is disposed at a position in the Z1-direction with respect to the portion 81_1, and the portion 83_1 is provided between the portion 81_1 and the portion 82_1. The portion 83_1 extends in the direction along the X-axis when viewed in the direction along the Y-axis, is coupled to an end of the portion 81_1 in the Z1-direction, and is coupled to an end of the portion 82_1 in the Z2-direction. In this manner, the heat of the portion 81_1 can be transferred to the portion 82_1 via the portion 83_1.

An aspect such as the shape, the size, and the disposition of the first heat transfer member 80_1 is not limited to the example illustrated in FIG. 10, and may be adopted in any desired way. For example, the first heat transfer member 80_1 may be a simple plate-shaped or block-shaped member. In addition, a surface of the portion 82_1 which faces the X2-direction may be thermally coupled to the first heat radiation member 70_1 via the second flexible wiring substrate 15_2.

The second head H_2 and related elements are configured as in the first head H_1 and related elements which are described above.

Specifically, the second head H_2 is provided with a third head side terminal TH_3 and a fourth head side terminal TH_4.

The third head side terminal TH_3 is a terminal provided for each nozzle N of the nozzle row Lb of the second head H_2 and electrically coupled to the piezoelectric element Eb of the second head H_2. A wire (not illustrated) in one end of the third flexible wiring substrate 15_3 is coupled to the third head side terminal TH_3 by a conductive joining material such as a conductive adhesive. The third flexible wiring substrate 15_3 is drawn out from an end of the second head H_2 in the X1-direction. In FIGS. 9 and 10, the third head side terminal TH_3 is located in the end of the second head H_2 in the X1-direction. However, as long as an aspect is adopted so that the third flexible wiring substrate 15_3 is drawn out from the end or the vicinity of the second head H_2 in the X1-direction, the third head side terminal TH_3 may be located at any desired position.

Here, as described above, the first head H_1 is not disposed at a position in the X1-direction with respect to the second head H_2. Therefore, the third flexible wiring substrate 15_3 can be drawn out from the end of the second head H_2 in the X1-direction.

The fourth head side terminal TH_4 is a terminal provided for each nozzle N of the nozzle row La of the second head H_2 and electrically coupled to the piezoelectric element Ea of the second head H_2. A wire (not illustrated) in one end of the fourth flexible wiring substrate 15_4 is coupled to the fourth head side terminal TH_4 by a conductive joining material such as a conductive adhesive. The fourth flexible wiring substrate 15_4 is drawn out from an end of the second head H_2 in the X2-direction. In FIGS. 9 and 10, the fourth head side terminal TH_4 is located in the end of the second head H_2 in the X2-direction. However, as long as an aspect is adopted so that the fourth flexible wiring substrate 15_4 is drawn out from the end or the vicinity of the second head H_2 in the X2-direction, the fourth head side terminal TH_4 may be located at any desired position.

Here, as described above, the first head H_1 is disposed at a position in the X2-direction with respect to the second head H_2. However, the second head H_2 is disposed to be displaced in the Y2-direction with respect to the first head H_1. Therefore, the fourth flexible wiring substrate 15_4 can be drawn out from the end of the second head H_2 in the X2-direction.

The third drive circuit 19_3 is disposed on a surface of the third flexible wiring substrate 15_3 which faces the outside, that is, a surface facing in a direction away from the second head H_2 out of both surfaces of the third flexible wiring substrate 15_3. The third drive circuit 19_3 is joined to a wire (not illustrated) of the third flexible wiring substrate 15_3 by a conductive joining material such as a conductive adhesive. On the other hand, the fourth drive circuit 19_4 is disposed on a surface of the fourth flexible wiring substrate 15_4 which faces the outside, that is, a surface facing in a direction away from the second head H_2 out of both surfaces of the fourth flexible wiring substrate 15_4. The fourth drive circuit 19_4 is joined to a wire (not illustrated) of the fourth flexible wiring substrate 15_4 by a conductive joining material such as a conductive adhesive.

On the other hand, the second drive circuit substrate 17_2 is disposed a position displaced in the X1-direction with respect to the center of the second head H_2, at a position in the Z1-direction with respect to the second head H_2. Here, the second drive circuit substrate 17_2 has a third surface F3 and a fourth surface F4 as plate surfaces, the third surface F3 is disposed to face the X1-direction, and the fourth surface F4 is disposed to face the X2-direction. In the example illustrated in FIG. 9, the second drive circuit substrate 17_2 is disposed at a position which does not overlap the second head H_2 when viewed in the direction along the Z-axis. That is, the second drive circuit substrate 17_2 is disposed at a position in the X1-direction with respect to the entire second head H_2.

The second drive circuit substrate 17_2 may overlap the second head H_2 when viewed in the direction along the Z-axis, as long as the second drive circuit substrate 17_2 is disposed at a position displaced in the X1-direction with respect to the center of the second head H_2. However, from a viewpoint of sufficiently securing an installation space for the flow path member 11*a*, it is preferable that the second drive circuit substrate 17_2 is disposed at a position which does not overlap the second head H_2 when viewed in the direction along the Z-axis.

The second drive circuit substrate 17_2 is provided with a third circuit side terminal TC_3 and a fourth circuit side terminal TC_4.

The third circuit side terminal TC_3 is a terminal provided in one end of a wire (not illustrated) that transmits a drive signal for the piezoelectric element Eb in the second drive circuit substrate 17_2. The third circuit side terminal TC_3 is provided on the third surface F3, and in the third circuit side terminal TC_3, a wire (not illustrated) in the other end of the third flexible wiring substrate 15_3 is coupled to the third circuit side terminal TC_3 by a conductive joining material such as a conductive adhesive.

The fourth circuit side terminal TC_4 is a terminal provided in one end of a wire (not illustrated) that transmits a drive signal for the piezoelectric element Ea in the second drive circuit substrate 17_2. The fourth circuit side terminal TC_4 is provided on the fourth surface F4, and in the fourth circuit side terminal TC_4, a wire (not illustrated) in the other end of the fourth flexible wiring substrate 15_4 is coupled to the fourth circuit side terminal TC_4 by a conductive joining material such as a conductive adhesive.

In this way, the third circuit side terminal TC_3 and the fourth circuit side terminal TC_4 are provided on surfaces of the second drive circuit substrate 17_2 which face directions opposite to each other. In this manner, without displacing positions of the terminals in the direction along the Y-axis, the positions of the third circuit side terminal TC_3 and the fourth circuit side terminal TC_4 can be displaced from each other in the direction along the Z-axis.

In the second drive circuit substrate 17_2, the fourth circuit side terminal TC_4 is disposed at a position in the Z2-direction with respect to the third circuit side terminal TC_3. In the example illustrated in FIG. 9, whereas the third circuit side terminal TC_3 is disposed at a position in the Z1-direction with respect to the center of the second drive circuit substrate 17_2 in the direction along the Z-axis, the fourth circuit side terminal TC_4 is disposed at a position in the Z2-direction with respect to the center of the second drive circuit substrate 17_2 in the direction along the Z-axis.

In this way, the fourth circuit side terminal TC_4 is disposed at the position in the Z2-direction with respect to the third circuit side terminal TC_3. In this manner, even when the lengths of the third flexible wiring substrate 15_3 and the fourth flexible wiring substrate 15_4 which are drawn around at a position in the X1-direction with respect to the flow path member 11*a* are equal to each other, a bending difference between these substrates can be reduced. As a result, a disconnection risk of these substrates can be reduced.

In addition to the third drive circuit 19_3, the second heat radiation member 70_2 is disposed on a surface of the third flexible wiring substrate 15_3 which faces the outside, that is, a surface facing a direction away from the fourth flexible wiring substrate 15_4 out of both surfaces of the third flexible wiring substrate 15_3.

The second heat radiation member 70_2 is disposed on the third flexible wiring substrate 15_3 in a state of being thermally coupled to a surface of the third drive circuit 19_3 which faces the X1-direction. The second heat radiation member 70_2 may be joined to the third drive circuit 19_3 by using an adhesive as long as the second heat radiation member 70_2 can be thermally coupled to the third drive circuit 19_3, may be in contact with the third drive circuit 19_3 without being joined thereto, or may face the third drive circuit 19_3 with a minute space therebetween. However, from a viewpoint of improving a thermal conductivity between the first heat radiation member 70_1 and the third drive circuit 19_3, it is preferable that the minute space is filled with a filler containing a thermal conductive filler or a heat transfer grease.

In the example illustrated in FIG. 10, the second heat radiation member 70_2 is configured as in the first heat radiation member 70_1 described above. Specifically, the second heat radiation member 70_2 includes a base portion 71_2 and a plurality of fins 72_2. The base portion 71_2 has a plate shape in which the direction along the X-axis is set as the plate thickness direction. The third drive circuit 19_3 and the second heat transfer member 80_2 are thermally coupled to a surface of the base portion 71_2 which faces the X2-direction. On the other hand, the plurality of fins 72_2 are provided on a surface of the base portion 71_2 which faces the X1-direction. Each of the plurality of fins 72_2 protrudes in the X1-direction, and extends in the direction along the Y-axis. In this manner, a surface area of the second heat radiation member 70_2 can be increased, and as a result, heat radiation of the second heat radiation member 70_2 can be improved.

A configuration of the second heat radiation member 70_2 is not limited to the example illustrated in FIG. 10, may be adopted in any desired way, and may be different from a configuration of the first heat radiation member 70_1. An aspect such as the shape and the size of the base portion 71_2 is not limited to the example illustrated in FIG. 10, and may be adopted in any desired way. For example, the aspect such as the shape, the number, and the disposition of the fin 72_2 is not limited to the example illustrated in FIG. 10, and may be adopted in any desired way, or may be omitted.

The second heat radiation member 70_2 described above is thermally coupled to the second heat transfer member 80_2. The second heat transfer member 80_2 is disposed to avoid the third flexible wiring substrate 15_3, and is thermally coupled to the second heat radiation member 70_2. The second heat transfer member 80_2 is thermally coupled to the fourth drive circuit 19_4 in addition to the second heat radiation member 70_2 via the fourth flexible wiring substrate 15_4. Here, the second heat transfer member 80_2 may be joined to the fourth flexible wiring substrate 15_4 by using an adhesive as long as the second heat transfer member 80_2 can be thermally coupled to the fourth flexible wiring substrate 15_4, may be in contact with the fourth flexible wiring substrate 15_4 without being joined thereto, or may face the fourth flexible wiring substrate 15_4 with a minute space therebetween. However, from a viewpoint of improving a thermal conductivity between the second heat transfer member 80_2 and the fourth drive circuit 19_4, it is preferable that the minute space is filled with a filler containing a thermal conductive filler or a heat transfer grease.

In the example illustrated in FIG. 10, the second heat transfer member 80_2 is configured as in the first heat transfer member 80_1 described above. Specifically, the second heat transfer member 80_2 has a portion 81_2, a portion 82_2, and a portion 83_2. Each of the portion 81_2 and the portion 82_2 has a plate shape in which the direction along the X-axis is set as the plate thickness direction. A surface of the portion 81_2 which faces the X2-direction is thermally coupled to the fourth drive circuit 19_4 via the fourth flexible wiring substrate 15_4. In this manner, the heat generated in the fourth drive circuit 19_4 can be received by the portion 81_2. On the other hand, a surface of the portion 82_2 which faces the X1-direction is thermally coupled to the second heat radiation member 70_2 without passing through the third flexible wiring substrate 15_3. In this manner, the heat of the portion 82_2 can be efficiently transferred to the second heat radiation member 70_2. Here, the portion 82_2 is disposed at a position in the Z1-direction with respect to the portion 81_2, and the portion 83_2 is provided between the portion 81_2 and the portion 82_2. The portion 83_2 extends in the direction along the X-axis when viewed in the direction along the Y-axis, is coupled to an end of the portion 81_2 in the Z1-direction, and is coupled to an end of the portion 82_2 in the Z2-direction. In this manner, the heat of the portion 81_2 can be transferred to the portion 82_2 via the portion 83_2.

An aspect such as the shape, the size, and the disposition of the second heat transfer member 80_2 is not limited to the example illustrated in FIG. 10, and may be adopted in any desired way, or may be different from an aspect of the first heat transfer member 80_1. For example, the second heat transfer member 80_2 may be a simple plate-shaped or block-shaped member. In addition, a surface of the portion 82_2 which faces the X1-direction may be thermally coupled to the second heat radiation member 70_2 via the third flexible wiring substrate 15_3.

Each of the heat radiation member 70 and the heat transfer member 80 which are described above needs to have a relatively high thermal conductivity. Therefore, each of the heat radiation member 70 and the heat transfer member 80 is formed of a material having a higher thermal conductivity than a material forming the first flexible wiring substrate 15_1 or the second flexible wiring substrate 15_2, for example, a metal material, or a thermally conductive material such as ceramics including silicon carbide, aluminum nitride, sapphire, alumina, silicon nitride, cermet, and yttria. Among these metal materials, from a viewpoint of having an excellent thermal conductivity, it is preferable to use the metal material. For example, as the metal material, gold (thermal conductivity at 20° C.: 295 W/mK), silver (thermal conductivity at 20° C.: 418 W/mK, copper (thermal conductivity at 20° C.: 386 W/mK), and aluminum (thermal conductivity at 20° C.: 204 W/mK) may be used.

However, as described above, whereas the first heat radiation member 70_1 is thermally coupled to the second drive circuit 19_2, the first heat radiation member 70_1 is not thermally coupled to the first drive circuit 19_1. Therefore, when the thermal conductivity of the first heat radiation member 70_1 is excessively higher than the thermal conductivity of the first heat transfer member 80_1, compared to indirect heat radiation from the first heat radiation member 70_1 via the first heat transfer member 80_1 of the first drive circuit 19_1, direct heat radiation from the first heat radiation member 70_1 of the second drive circuit 19_2 is excessively large. As a result, a difference between the temperature of the first drive circuit 19_1 and the temperature of the second drive circuit 19_2 increases.

Accordingly, from a viewpoint of suppressing the heat radiation of the heat radiation member 70 to some extent and improving a heat transfer property of the heat transfer member 80, it is preferable that the heat transfer member 80 is formed of a material having a higher thermal conductivity than a material forming the heat radiation member 70. When the first heat transfer member 80_1 is formed of the material having the higher thermal conductivity than the material forming the first heat radiation member 70_1, compared to an aspect in which the first heat transfer member 80_1 is formed of a material having an equal or lower thermal conductivity than the material forming the first heat radiation member 70_1, the heat generated in the first drive circuit 19_1 can be efficiently transferred from the first heat transfer member 80_1 to the first heat radiation member 70_1. As a result, a difference between the temperature of the first drive circuit 19_1 and the temperature of the second drive circuit 19_2 is reduced. Therefore, operations of both the first drive circuit 19_1 and the second drive circuit 19_2 can be stabilized. Similarly, when the second heat transfer member 80_2 is formed of a material having the higher thermal conductivity than the material forming the second heat radiation member 70_2, operations of both the third drive circuit 19_3 and the fourth drive circuit 19_4 can be stabilized.

In contrast, in the aspect in which the first heat transfer member 80_1 is formed of the material having the equal or lower thermal conductivity than the material forming the first heat radiation member 70_1, whereas heat radiation of the second drive circuit 19_2 thermally coupled to the first heat radiation member 70_1 is promoted, heat radiation of the first drive circuit 19_1 is less likely to occur. Therefore, a difference between the temperature of the first drive circuit 19_1 and the temperature of the second drive circuit 19_2 increases. As a result, due to an excessively raised temperature of the first drive circuit 19_1, an operation of the first drive circuit 19_1 becomes unstable, and a discharge characteristic of the head H or a transmission rate of the signal varies. Similarly, in the aspect in which the second heat transfer member 80_2 is formed of the material having the thermal conductivity equal to or lower than that of the material forming the second heat radiation member 70_2, an operation of the fourth drive circuit 19_4 is likely to be unstable.

However, when a difference in the thermal conductivity between the material forming the heat transfer member 80 and the material forming the heat radiation member 70 is excessively large, on the contrary, there is a problem in that the difference between the temperature of the first drive circuit 19_1 and the temperature of the second drive circuit 19_2 increases or the difference between the temperature of the third drive circuit 19_3 and the temperature of the fourth drive circuit 19_4 increases. Therefore, from a viewpoint of solving this problem, it is preferable that the difference in the thermal conductivity between the material forming the heat transfer member 80 and the material forming the heat radiation member 70 is smaller than the difference in the thermal conductivity between the material forming the heat radiation member 70 and the material forming the flexible wiring substrate 15. Specifically, it is preferable that the thermal conductivity 20 W/mK or higher and 320 W/mK or lower.

An insulating substrate of the flexible wiring substrate used for the first flexible wiring substrate 15_1 and the second flexible wiring substrate 15_2 is usually formed of a resin such as polyimide or polyester which has a significantly lower thermal conductivity than metal. Therefore, when each of the first heat radiation member 70_1 and the first heat transfer member 80_1 is formed of the metal, the difference in the thermal conductivity between the material forming the heat transfer member 80 and the material forming the heat radiation member 70 can be smaller than the difference in the thermal conductivity between the material forming the heat radiation member 70 and the material forming the flexible wiring substrate 15.

From a viewpoint of the thermal conductivity as described above, for example, when the forming material of the heat radiation member 70 is aluminum (thermal conductivity at 20° C.: 204 W/mK), it is preferable that the forming material of the heat transfer member 80 is gold (thermal conductivity at 20° C.: 295 W/mK), silver (thermal conductivity at 20° C.: 418 W/mK), and copper (thermal conductivity at 20° C.: 386 W/mK), or an alloy thereof. In addition, when the forming material of the heat radiation member 70 is copper (thermal conductivity at 20° C.: 386 W/mK), it is preferable that the forming material of the heat transfer member 80 is silver (thermal conductivity at 20° C.: 418 W/mK) or an alloy thereof.

As described above, the head unit 1 includes the first head H_1, the second head H_2, the first flexible wiring substrate 15_1, the second flexible wiring substrate 15_2, the first heat radiation member 70_1, and the first heat transfer member 80_1.

Here, as described above, the first head H_1 includes the piezoelectric element Eb which is an example of the "first piezoelectric element", the first head side terminal TH_1 electrically coupled to the piezoelectric element Eb, the piezoelectric element Ea which is an example of the "second piezoelectric element", and the second head side terminal TH_2 electrically coupled to the piezoelectric element Ea. A portion of the second head H_2 overlaps the first head H_1 when viewed in the direction along the X-axis, and the other portion does not overlap the first head H_1. When viewed in the direction along the Y-axis orthogonal to the direction along the X-axis, the second head H_2 is located at a position which does not overlap the first head H_1. The direction along the X-axis is an example of the "first direction", and the direction along the Y-axis is an example of the "second direction".

One end of the first flexible wiring substrate 15_1 is coupled to the first head side terminal TH_1, the first flexible wiring substrate 15_1 is drawn out from the first head H_1 in the X1-direction, and the first flexible wiring substrate 15_1 is provided with the first drive circuit 19_1. The X1-direction is an example of "one side in the first direction". On the other hand, one end of the second flexible wiring substrate 15_2 is coupled to the second head side terminal TH_2, the second flexible wiring substrate 15_2 is drawn out from the first head H_1 in the X2-direction, and the second flexible wiring substrate 15_2 is provided with the second drive circuit 19_2. The X2-direction is an example of the "other side in the first direction".

The first heat radiation member 70_1 is thermally coupled to the second drive circuit 19_2 and is not thermally coupled to the first drive circuit 19_1. The first heat transfer member 80_1 is thermally coupled to each of the first drive circuit 19_1 and the first heat radiation member 70_1, and transfers the heat generated in the first drive circuit 19_1 to the first heat radiation member 70_1.

In the head unit 1 described above, the first heat transfer member 80_1 transfers the heat generated in the first drive circuit 19_1 to the first heat radiation member 70_1. Therefore, even when the first heat radiation member 70_1 is not thermally coupled to the first drive circuit 19_1, the heat generated in the first drive circuit 19_1 can be radiated to the outside from the first heat radiation member 70_1. Therefore, both the heat generated in the first drive circuit 19_1 and the heat generated in the second drive circuit 19_2 can be radiated to the outside from the first heat radiation member 70_1. In this way, it is not necessary to dispose the heat radiation member thermally coupled to the first drive circuit 19_1. Accordingly, the first head H_1 and the second head H_2 can be brought closer to each other. As a result, a size of the head unit 1 can be reduced.

Here, as described above, it is preferable that the first heat transfer member 80_1 is formed of the material having the higher thermal conductivity than the material forming the first heat radiation member 70_1. In this case, compared to an aspect in which the first heat transfer member 80_1 is formed of the material having the equal or lower thermal conductivity than the material forming the first heat radiation member 70_1, the heat generated in the first drive circuit 19_1 can be efficiently transferred from the first heat transfer member 80_1 to the first heat radiation member 70_1. As a result, a difference between the temperature of the first drive circuit 19_1 and the temperature of the second drive circuit 19_2 is reduced. Therefore, operations of both the first drive circuit 19_1 and the second drive circuit 19_2 can be stabilized.

In addition, as described above, it is preferable that the first heat radiation member 70_1 is formed of the material having the higher thermal conductivity than the material forming the first flexible wiring substrate 15_1 or the second flexible wiring substrate 15_2. In this case, both the heat generated in the first drive circuit 19_1 and the heat generated in the second drive circuit 19_2 can be efficiently radiated to the outside from the first heat radiation member 70_1.

Furthermore, as described above, it is preferable that the difference in the thermal conductivity between the material forming the first heat transfer member 80_1 and the material forming the first heat radiation member 70_1 is smaller than the difference in the thermal conductivity between the material forming the first heat radiation member 70_1 and the material forming the substrate 15_1 or the second flexible wiring substrate 15_2. In this way, the difference in the thermal conductivity between the material forming the first heat transfer member 80_1 and the material forming the first heat radiation member 70_1 is reduced. In this manner, both the heat generated in the first drive circuit 19_1 and the heat generated in the second drive circuit 19_2 can be efficiently radiated to the outside from the first heat radiation member 70_1. In addition, the difference in the thermal conductivity between the material forming the first heat radiation member 70_1 and the material forming the first flexible wiring substrate 15_1 or the second flexible wiring substrate 15_2 is increased. In this manner, there is an advantage in that substrate characteristics of the first flexible wiring substrate 15_1 and the second flexible wiring substrate 15_2 are easily improved.

In addition, as described above, whereas each of the first heat radiation member 70_1 and the first heat transfer member 80_1 is formed of the metal, it is preferable that each insulating substrate of the first flexible wiring substrate 15_1 and the second flexible wiring substrate 15_2 is formed of the resin. In this way, since each of the first heat radiation member 70_1 and the first heat transfer member 80_1 is formed of the metal, both the heat generated in the first drive circuit 19_1 and the heat generated in the second drive circuit 19_2 can be efficiently radiated to the outside from the first heat radiation member 70_1. In addition, since each of the first flexible wiring substrate 15_1 and the second flexible wiring substrate 15_2 is formed of the resin, there is an advantage in that substrate characteristics of the first flexible wiring substrate 15_1 and the second flexible wiring substrate 15_2 are easily improved.

Furthermore, as described above, the head unit 1 further includes the flow path member 11*a*. The flow path member 11*a* is disposed at a position in the Z1-direction with respect to the first head H_1, and supplies the liquid to the first head H_1. The Z1-direction is an example of "one side in the third direction orthogonal to both the first direction and the second direction". The first flexible wiring substrate 15_1 passes between the first head H_1 and the flow path member 11*a*. On the other hand, the second flexible wiring substrate 15_2 does not pass between the first head H_1 and the flow path member 11*a*. Moreover, each of the first drive circuit 19_1 and the second drive circuit 19_2 is located in the X2-direction with respect to the flow path member 11*a*. Therefore, the first drive circuit 19_1 and the second drive circuit 19_2 can be brought closer to each other at a position in the X2-direction with respect to the flow path member 11*a*. As a result, compared to an aspect in which the first drive circuit 19_1 and the second drive circuit 19_2 are disposed to interpose the flow path member 11*a* therebetween, the heat transfer of the liquid inside the flow path member 11*a* from the first drive circuit 19_1 and the second drive circuit 19_2 can be reduced.

In addition, as described above, the head unit 1 further includes the holder 13 and the fixing plate 14. The holder 13 is formed of the material having the higher thermal conductivity than the material forming the first flexible wiring substrate 15_1 or the second flexible wiring substrate 15_2. The fixing plate 14 fixes the first head H_1 and the second head H_2 to the holder 13 in common. Moreover, the first heat radiation member 70_1 is thermally coupled to the holder 13. Therefore, the heat can be efficiently radiated to the outside from the first heat radiation member 70_1 via the holder 13.

Furthermore, as described above, the head unit 1 further includes the discharge surface FN. The plurality of nozzles N of the first head H_1 and the second head H_2 are open on the discharge surface FN. The discharge surface FN includes the first portion PA1, the second portion PA2, and the third portion PA3 when viewed in the direction along the Z-axis. The direction along the Z-axis is an example of the "third direction". The first portion PA1 includes a portion of the first head H_1 and a portion of the second head H_2 when viewed in the direction along the Z-axis. The second portion PA2 includes the other portion of the first head H_1 without including the second head H_2 when viewed in the direction along the Z-axis, and the width W2 of the second portion PA2 in the direction along the X-axis is shorter than the width W1 of the first portion PA1 in the direction along the X-axis. The third portion PA3 includes the other portion of the second head H_2 without including the first head H_1 when viewed in the direction along the Z-axis, and the width W3 of the third portion PA3 in the direction along the X-axis is shorter than the width W1 of the first portion PA1 in the direction along the X-axis.

Since the first portion PA1, the second portion PA2, and the third portion PA3 are provided, the first flexible wiring substrate 15_1 can be drawn out from the position of the first head H_1 in the X1-direction, and the second flexible wiring substrate 15_2 can be drawn out from the position of the first head H_1 in the X2-direction. Similarly, the third flexible wiring substrate 15_3 can be drawn out from the position of the second head H_2 in the X1-direction, and the fourth flexible wiring substrate 15_4 can be drawn out from the position of the third head in the X2-direction.

In addition, as described above, the head unit 1 further includes the third flexible wiring substrate 15_3, the fourth flexible wiring substrate 15_4, the second heat radiation member 70_2, and the second heat transfer member 80_2. The third flexible wiring substrate 15_3 is drawn out from the position of the second head H_2 in the X1-direction, and the third flexible wiring substrate 15_3 is provided with the third drive circuit 19_3. The fourth flexible wiring substrate 15_4 is drawn out from the position of the second head H_2 in the X2-direction, and the fourth flexible wiring substrate 15_4 is provided with the fourth drive circuit 19_4. The second heat radiation member 70_2 is disposed to be thermally coupled to the third drive circuit 19_3 without being thermally coupled to the fourth drive circuit 19_4. The second heat transfer member 80_2 is thermally coupled to each of the fourth drive circuit 19_4 and the second heat radiation member 70_2, and transfers the heat generated in the fourth drive circuit 19_4 to the second heat radiation member 70_2. The second head H_2 includes the third head side terminal TH_3 coupled to one end of the third flexible wiring substrate 15_3 and the fourth head side terminal TH_4 coupled to one end of the fourth flexible wiring substrate 15_4.

In the head unit 1 configured in this way, the second heat transfer member 80_2 transfers the heat generated in the fourth drive circuit 19_4 to the fourth heat radiation member. Therefore, even when the second heat radiation member 70_2 is not thermally coupled to the fourth drive circuit 19_4, the heat generated in the fourth drive circuit 19_4 can be radiated to the outside from the second heat radiation member 70_2. Therefore, both the heat generated in the third drive circuit 19_3 and the heat generated in the fourth drive circuit 19_4 can be radiated to the outside from the second heat radiation member 70_2. In this way, it is not necessary to dispose the heat radiation member thermally coupled to the fourth drive circuit 19_4. Therefore, the third head and the fourth head can be brought closer to each other. As a result, a size of the head unit 1 can be reduced.

Furthermore, as described above, the second head H_2 is disposed at the position in the X1-direction with respect to the first head H_1. Therefore, the first heat radiation member 70_1 and the second heat radiation member 70_2 can be disposed to be separated from each other in the direction along the X-axis.

In addition, as described above, the liquid discharge apparatus 100 includes the head unit 1 and the first drive circuit substrate 17_1. The first drive circuit substrate 17_1 includes the first circuit side terminal TC_1 to which the other end of the first flexible wiring substrate 15_1 is coupled, and the second circuit side terminal TC_2 to which the other end of the second flexible wiring substrate 15_2 is coupled, and transmits the drive signal for driving the piezoelectric element Ea and the piezoelectric element Eb of the first head H_1.

Furthermore, as described above, the first drive circuit substrate 17_1 includes the first surface F1 which faces the X1-direction and the second surface F2 which faces the X2-direction. The first circuit side terminal TC_1 is provided on the first surface F1. The second circuit side terminal TC_2 is provided on the second surface F2. Therefore, without changing positions of the first circuit side terminal TC_1 and the second circuit side terminal TC_2 to be different in the direction along the Y-axis, the positions of the first circuit side terminal TC_1 and the second circuit side terminal TC_2 can be changed to be different in the direction along the Z-axis. In this manner, a bending difference between the first flexible wiring substrate 15_1 and the second flexible wiring substrate 15_2 can be reduced. As a result, a disconnection risk of the first flexible wiring substrate 15_1 and the second flexible wiring substrate 15_2 can be reduced.

2. Modification Examples

The forms described above as example can be modified in various ways. Specific modification aspects that can be applied to the above-described forms will be described below as examples. Any two or more aspects selected from the following examples can be combined as appropriate within a mutually consistent range.

2-1. Modification Example 1

Figure 11:
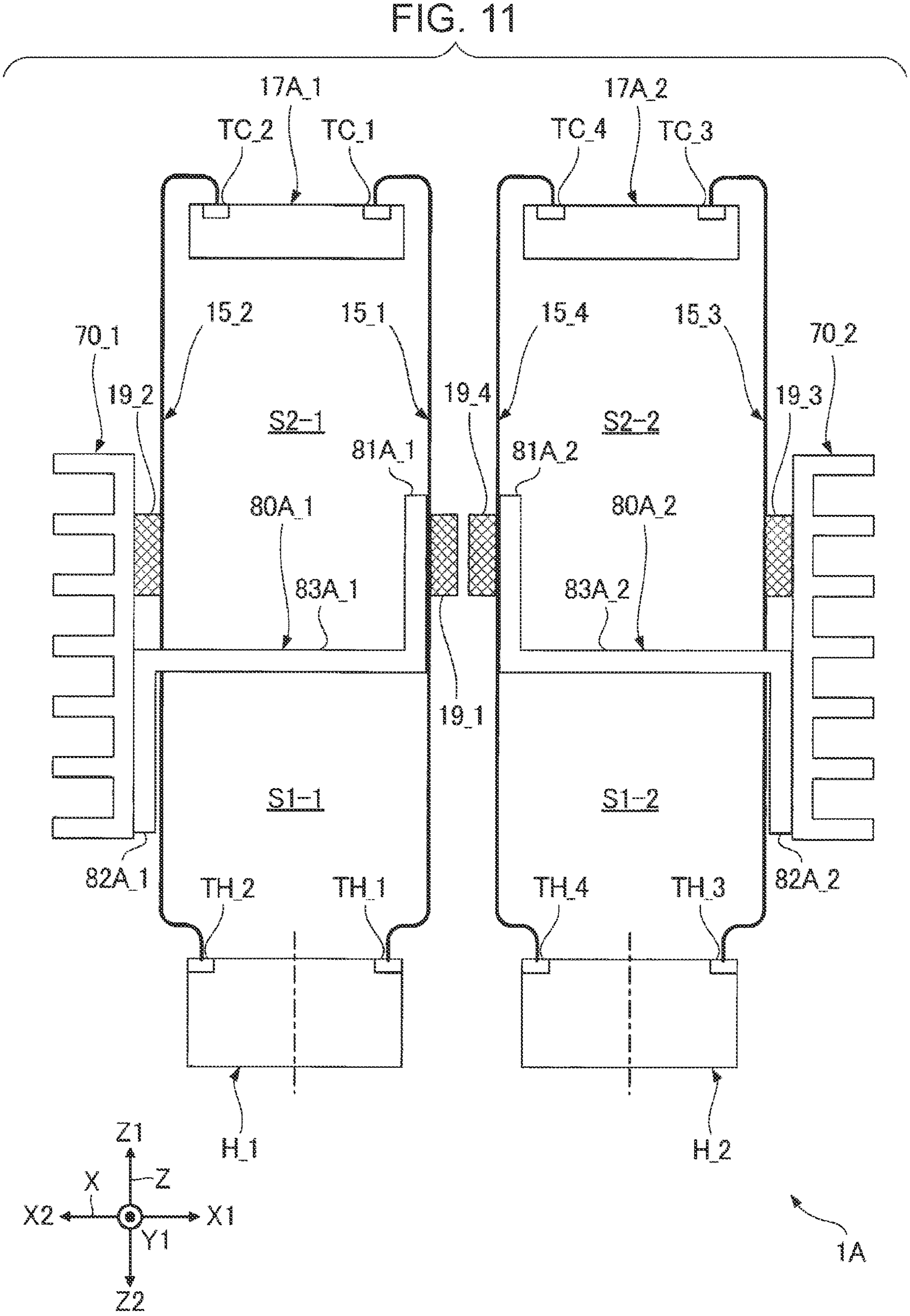
FIG. 11 is a schematic view for describing a head unit of Modification Example 1.

FIG. 11 is a schematic view for describing a head unit 1A of Modification Example 1. The head unit 1A includes a first drive circuit substrate 17A_1 and a second drive circuit substrate 17A_2 instead of the first drive circuit substrate 17_1 and the second drive circuit substrate 17_2, and is configured as in the head unit 1 of the above-described embodiment except that a first heat transfer member 80A_1 and a second heat transfer member 80A_2 are provided instead of the first heat transfer member 80_1 and the second heat transfer member 80_2. Hereinafter, each of the first drive circuit substrate 17A_1 and the second drive circuit substrate 17A_2 may be referred to as a drive circuit substrate 17A in some cases. Each of the first heat transfer member 80A_1 and the second heat transfer member 80A_2 may be referred to as a heat transfer member 80A in some cases.

For convenience of description, FIG. 11 schematically illustrates the disposition of the head H, the drive circuit substrate 17A, the flexible wiring substrate 15, the heat radiation member 70, and the heat transfer member 80A when viewed in the Y2-direction. In FIG. 11, for convenience of description, each portion is schematically illustrated, and dimensions of each portion are appropriately different from actual dimensions.

In Modification Example 1, the first flexible wiring substrate 15_1 is drawn out in the Z1-direction from the end of the first head H_1 in the X1-direction as in the head unit 1 described above. However, the second flexible wiring substrate 15_2 is drawn around in the Z1-direction from the end of the first head H_1 in the X2-direction unlike the head unit 1 described above. That is, each of the first flexible wiring substrate 15_1 and the second flexible wiring substrate 15_2 is directly drawn around from the first head H_1 in the Z1-direction. Therefore, in Modification Example 1, a space having the width of the first head H_1 in the direction along the X-axis is formed between the first flexible wiring substrate 15_1 and the second flexible wiring substrate 15_2.

The first drive circuit substrate 17A_1 and the first heat transfer member 80A_1 are disposed in the space. The first heat transfer member 80A_1 is disposed to divide the space into a space S2-1 and a space S1-1. The first drive circuit substrate 17A_1 is disposed at a position in the Z1-direction with respect to the first heat transfer member 80A_1 so that the direction along the Z-axis is set as the plate thickness direction. Here, the space between the first drive circuit substrate 17A_1 and the first heat transfer member 80A_1 is the space S2-1. In addition, both the first circuit side terminal TC_1 and the second circuit side terminal TC_2 are provided on the surface of the first drive circuit substrate 17A_1 which faces the Z1-direction.

In an example illustrated in FIG. 11, the first heat transfer member 80A_1 has a portion 81A_1, a portion 82A_1, and a portion 83A_1. Each of the portion 81A_1 and the portion 82A_1 has a plate shape in which the direction along the X-axis is set as the plate thickness direction. A surface of the portion 81A_1 which faces the X1-direction is thermally coupled to the first drive circuit 19_1 via the first flexible wiring substrate 15_1. In this manner, the heat generated in the first drive circuit 19_1 can be received by the portion 81A_1. On the other hand, a surface of the portion 82A_1 which faces the X2-direction is thermally coupled to the first heat radiation member 70_1 without passing through the second flexible wiring substrate 15_2. In this manner, the heat of the portion 82A_1 can be efficiently transferred to the first heat radiation member 70_1. Here, the portion 82A_1 is disposed at a position in the Z2-direction with respect to the portion 81A_1, and the portion 83A_1 is provided between the portion 81A_1 and the portion 82A_1. The portion 83A_1 extends in the direction along the X-axis when viewed in the direction along the Y-axis, is coupled to an end of the portion 81A_1 in the Z2-direction, and is coupled to an end of the portion 82A_1 in the Z1-direction. In this manner, the heat of the portion 81A_1 can be transferred to the portion 82A_1 via the portion 83A_1.

An aspect such as a shape, a size, and a disposition of the first heat transfer member 80A_1 is not limited to the example illustrated in FIG. 11, and may be adopted in any desired way. For example, the first heat transfer member 80A_1 may be a simple plate-shaped or block-shaped member. In addition, a surface of the portion 82A_1 which faces the X2-direction may be thermally coupled to the first heat radiation member 70_1 via the second flexible wiring substrate 15_2.

As in the first flexible wiring substrate 15_1 and the second flexible wiring substrate 15_2 described above, each of the third flexible wiring substrate 15_3 and the fourth flexible wiring substrate 15_4 is directly drawn around from the second head H_2 in the Z1-direction. Therefore, in Modification Example 1, a space having the width of the second head H_2 in the direction along the X-axis is formed between the third flexible wiring substrate 15_3 and the fourth flexible wiring substrate 15_4.

The second drive circuit substrate 17A_2 and the second heat transfer member 80A_2 are disposed in the space. The second heat transfer member 80A_2 is disposed to divide the space into a space S2-2 and a space S1-2. The second drive circuit substrate 17A_2 is disposed at a position in the Z1-direction with respect to the second heat transfer member 80A_2 so that the direction along the Z-axis is set as the plate thickness direction. Here, the space between the second drive circuit substrate 17A_2 and the second heat transfer member 80A_2 is the space S2-2. In addition, both the third circuit side terminal TC_3 and the fourth circuit side terminal TC_4 are provided on a surface of the second drive circuit substrate 17A_2 which faces the Z1-direction.

In the example illustrated in FIG. 11, the second heat transfer member 80A_2 has a portion 81A_2, a portion 82A_2, and a portion 83A_2. Each of the portion 81A_2 and the portion 82A_2 has a plate shape in which the direction along the X-axis is set as the plate thickness direction. A surface of the portion 81A_2 which faces the X2-direction is thermally coupled to the fourth drive circuit 19_4 via the fourth flexible wiring substrate 15_4. In this manner, the heat generated in the fourth drive circuit 19_4 can be received by the portion 81A_2. On the other hand, a surface of the portion 82A_2 which faces the X1-direction is thermally coupled to the second heat radiation member 70_2 without passing through the third flexible wiring substrate 15_3. In this manner, the heat of the portion 82A_2 can be efficiently transferred to the second heat radiation member 70_2. Here, the portion 82A_2 is disposed at a position in the Z2-direction with respect to the portion 81A_2, and the portion 83A_2 is provided between the portion 81A_2 and the portion 82A_2. The portion 83A_2 extends in the direction along the X-axis when viewed in the direction along the Y-axis, is coupled to an end of the portion 81A_2 in the Z2-direction, and is coupled to an end of the portion 82A_2 in the Z1-direction. In this manner, the heat of the portion 81A_2 can be transferred to the portion 82A_2 via the portion 83A_2.

An aspect such as a shape, a size, and a disposition of the second heat transfer member 80A_2 is not limited to the example illustrated in FIG. 11, and may be adopted in any desired way, or may be different from an aspect of the first heat transfer member 80A_1. For example, the second heat transfer member 80A_2 may be a simple plate-shaped or block-shaped member. In addition, a surface of the portion 82A_2 which faces the X1-direction may be thermally coupled to the second heat radiation member 70_2 via the third flexible wiring substrate 15_3.

In Modification Example 1 described above, the size of the head unit 1 can be reduced, and the heat generated in the drive circuit 19 can also be efficiently radiated. In Modification Example 1, the flow path member 11*a* may be disposed in the space including the spaces S1-1 and S1-2, or the flow path member 11*a* may be disposed in the space including the spaces S2-1 and S2-2.

2-2. Modification Example 2

In the above-described embodiment, an aspect in which an element relating to the first head H_1 and an element relating to the second head H_2 are configured to be symmetrical in the direction along the X-axis in the head unit 1 when viewed in the direction along the Y-axis has been described as an example. However, the present disclosure is not limited to this aspect. For example, the positions of the first drive circuit substrate 17_1 and the second drive circuit substrate 17_2 in the direction along the Z-axis may be different from each other. In addition, each length of the first flexible wiring substrate 15_1 and the second flexible wiring substrate 15_2 and each length of the third flexible wiring substrate 15_3 and the fourth flexible wiring substrate 15_4 may be different from each other.

2-3. Modification Example 3

The liquid discharge apparatus described in the above-described embodiment as an example can be adopted not only for an apparatus dedicated to printing but also for various apparatus such as a facsimile apparatus and a copying machine. As a matter of course, an application of the liquid discharge apparatus is not limited to the printing. For example, a liquid discharge apparatus that discharges a solution of a coloring material is used as a manufacturing apparatus forming a color filter of a display apparatus such as a liquid crystal display panel. In addition, a liquid discharge apparatus that discharges a solution of a conductive material is used as a manufacturing apparatus forming a wire or an electrode on a wiring substrate. In addition, a liquid discharge apparatus that discharges a solution of an organic substance relating to a living body is used as a manufacturing apparatus manufacturing a biochip, for example.

What is claimed is:

1. A head unit comprising:

a first head having a first piezoelectric element, a first head side terminal electrically coupled to the first piezoelectric element, a second piezoelectric element, and a second head side terminal electrically coupled to the second piezoelectric element;

a second head having a portion overlapping the first head when viewed in a first direction, having the other portion not overlapping the first head, and located at a position which does not overlap the first head when viewed in a second direction orthogonal to the first direction;

a first flexible wiring substrate having one end coupled to the first head side terminal, drawn out from one side of the first head in the first direction, and provided with a first drive circuit;

a second flexible wiring substrate having one end coupled to the second head side terminal, drawn out from another side of the first head in the first direction, and provided with a second drive circuit;

a first heat radiation member thermally coupled to the second drive circuit, and not thermally coupled to the first drive circuit; and a first heat transfer member thermally coupled to the first drive circuit and the first heat radiation member, and transferring heat generated by the first drive circuit to the first heat radiation member.

2. The head unit according to claim 1, wherein the first heat transfer member is formed of a material having a higher thermal conductivity than a material forming the first heat radiation member.

3. The head unit according to claim 2, wherein the first heat radiation member is formed of a material having a higher thermal conductivity than a material forming the first flexible wiring substrate or the second flexible wiring substrate.

4. The head unit according to claim 3, wherein a difference in a thermal conductivity between the material forming the first heat transfer member and the material forming the first heat radiation member is smaller than a difference in the thermal conductivity between the material forming the first heat radiation member and the material forming the first flexible wiring substrate or the second flexible wiring substrate.

5. The head unit according to claim 2, wherein the first heat radiation member and the first heat transfer member are formed of metal, and insulating substrates of the first flexible wiring substrate and the second flexible wiring substrate are formed of a resin.

6. The head unit according to claim 1, further comprising:

a flow path member disposed on one side of the first head in a third direction orthogonal to both the first direction and the second direction, and supplying a liquid to the first head, wherein the first flexible wiring substrate passes between the first head and the flow path member, the second flexible wiring substrate does not pass between the first head and the flow path member, and the first drive circuit and the second drive circuit are located on the other side of the flow path member in the first direction.

7. The head unit according to claim 1, further comprising:

a holder formed of a material having a higher thermal conductivity than a material forming the first flexible wiring substrate or the second flexible wiring substrate; and a fixing plate that fixes the first head and the second head to the holder in common, wherein the first heat radiation member is thermally coupled to the holder.

8. The head unit according to claim 1, further comprising:

a discharge surface on which a plurality of nozzles of the first head and the second head are open, wherein when viewed in a third direction orthogonal to both the first direction and the second direction, the discharge surface includes a first portion including a portion of the first head and a portion of the second head, a second portion including the other portion of the first head without including the second head, and having a shorter width than the first portion in the first direction, and a third portion including the other portion of the second head without including the first head, and having a shorter width than the first portion in the first direction.

9. The head unit according to claim 1, further comprising:

a third flexible wiring substrate drawn out from a position of the second head on one side in the first direction, and provided with a third drive circuit;

a fourth flexible wiring substrate drawn out from a position of the second head on the other side in the first direction, and provided with a fourth drive circuit;

a second heat radiation member thermally coupled to the third drive circuit, and disposed without being thermally coupled to the fourth drive circuit; and a second heat transfer member thermally coupled to the fourth drive circuit and the second heat radiation member, and transferring heat generated by the fourth drive circuit to the second heat radiation member, wherein the second head includes a third head side terminal coupled to one end of the third flexible wiring substrate, and a fourth head side terminal coupled to one end of the fourth flexible wiring substrate.

10. The head unit according to claim 9, wherein the second head is disposed at a position on one side of the first head in the first direction.

11. A liquid discharge apparatus comprising:

the head unit according to claim 1; and a first drive circuit substrate including a first circuit side terminal to which the other end of the first flexible wiring substrate is coupled, and a second circuit side terminal to which the other end of the second flexible wiring substrate is coupled, and transmitting a drive signal for driving the first piezoelectric element and the second piezoelectric element.

12. The liquid discharge apparatus according to claim 11, wherein the first drive circuit substrate includes a first surface provided with the first circuit side terminal, and facing one side in the first direction, and a second surface provided with the second circuit side terminal, and facing the other side in the first direction.

* * * * *